United States Patent
Honda et al.

(10) Patent No.: US 9,645,773 B2
(45) Date of Patent: *May 9, 2017

(54) PERIPHERAL DEVICE CONTROL SYSTEM, PRINTING DEVICE, PERIPHERAL DEVICE CONTROL METHOD, AND PROGRAM FOR PROVIDING INFORMATION REGARDING AN AMOUNT OF COLOR MATERIAL

(71) Applicant: CANON KABUSHIKI KAISHA, Tokyo (JP)

(72) Inventors: Hideki Honda, Kawasaki (JP); Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,331

(22) Filed: Jul. 30, 2015

(65) Prior Publication Data

US 2015/0339081 A1 Nov. 26, 2015

Related U.S. Application Data

(63) Continuation of application No. 14/591,846, filed on Jan. 7, 2015, now Pat. No. 9,124,727, which is a
(Continued)

(30) Foreign Application Priority Data

Dec. 16, 2004 (JP) ................................ 2004-364441
Sep. 27, 2005 (JP) ................................ 2005-280107

(51) Int. Cl.
*G06F 3/12* (2006.01)
*G06K 15/00* (2006.01)
(Continued)

(52) U.S. Cl.
CPC .......... *G06F 3/121* (2013.01); *B41J 2/17546* (2013.01); *B41J 2/17566* (2013.01); *G03G 15/105* (2013.01); *G03G 15/55* (2013.01); *G06F 3/1229* (2013.01); *G06K 15/102* (2013.01); *G06K 15/129* (2013.01); *G06K 15/4075* (2013.01);
(Continued)

(58) Field of Classification Search
None
See application file for complete search history.

(56) References Cited

U.S. PATENT DOCUMENTS

| | | | | |
|---|---|---|---|---|
| 5,818,471 A * | 10/1998 | Shimamura | .......... | B41J 2/17566 347/5 |
| 6,957,888 B1 * | 10/2005 | Currans | .................. | H04N 1/32 283/74 |
| 2002/0036783 A1 * | 3/2002 | Yoshidome | ............... | G06T 5/20 358/1.9 |
| 2002/0077979 A1 * | 6/2002 | Nagata | ................... | G06Q 10/06 705/40 |
| 2002/0122193 A1 * | 9/2002 | Shirasawa | ............ | H04N 1/6072 358/1.9 |
| 2002/0134829 A1 * | 9/2002 | Tanaka | ................. | B41J 2/17546 235/375 |
| 2003/0058461 A1 * | 3/2003 | Chang | .................... | G06K 15/02 358/1.9 |
| 2003/0128258 A1 * | 7/2003 | Hou | ..................... | B41J 2/17536 347/86 |

(Continued)

Primary Examiner — Ming Hon
(74) Attorney, Agent, or Firm — Canon U.S.A., Inc. IP Division

(57) ABSTRACT

An application in an image processing apparatus presents information about ink installed in a peripheral device, such as the shape, color, size, arrangement direction, and a remaining ink level of an ink tank, in a visually realistic manner using accurate graphics. The image processing apparatus acquires ink information about, in particular, a remaining ink level, arrangement direction, and the order of the arrangement of the ink tank, and displays the information about the peripheral device in a user interface of the application using the acquired ink information.

20 Claims, 36 Drawing Sheets

Related U.S. Application Data continuation of application No. 11/300,137, filed on Dec. 14, 2005, now Pat. No. 8,947,694.

(51) Int. Cl.
*G03G 15/10* (2006.01)
*G03G 15/00* (2006.01)
*B41J 2/175* (2006.01)
*G06K 15/10* (2006.01)
*G06K 15/12* (2006.01)
*H04N 1/00* (2006.01)

(52) U.S. Cl.
CPC . *H04N 1/00023* (2013.01); *H04N 2201/0094* (2013.01)

(56) References Cited

U.S. PATENT DOCUMENTS

| | | | |
|---|---|---|---|
| 2005/0052667 A1* | 3/2005 | Yamazaki | H04N 1/54 358/1.9 |
| 2005/0151812 A1* | 7/2005 | Sasaki | B41J 2/17513 347/86 |
| 2006/0071952 A1* | 4/2006 | Motominami | B41J 2/1752 347/5 |
| 2007/0242032 A1* | 10/2007 | Cortenraad | G09G 3/00 345/107 |

* cited by examiner

FIG. 6

Definition: InkInfo
Node Type: Property
Description: INK INFORMATION
Full Schema Path: ¥Printer.InkInfo Definition: [Color]
Node Type: Property
Description: COLOR INFORMATION
Full Schema Path: ¥Printer.InkInfo.
Allowed Values:
- Black  // BLACK
- Cyan   // CYAN
- Magenta // MAGENTA
- Yellow // YELLOW
- Photo  // PHOTO
- Color  // COLOR Definition: Installed
Node Type: Value
Data Type: Boolean
Definition: [Color] PRESENCE OF INK OF COLOR [Color]
Full Schema Path: ¥Printer.InkInfo.[Color]:Installed
Allowed Values:
- True  // MOUNTED
- False // NOT MOUNTED Definition: State
Node Type: Value
Data Type: String
Description: [Color] REMAINING INK LEVEL OF COLOR [Color]
Full Schema Path: ¥Printer.InkInfo.[Color]:State
Allowed Values:
- Full // INK FULL
- Low  // LOW REMAINING INK LEVEL
- Out  // INK EMPTY
- Unknown // UNKNOWN REMAINING INK LEVEL Definition: ModelName
Node Type: Value
Data Type: String
Description: [Color] TYPE OF INK OF COLOR [Color]
Full Schema Path: ¥Printer.InkInfo.[Color]:ModelName
Examples:
- CI-B // BLACK INK
- CI-C // CYAN INK
- CI-M // MAGENTA INK
- CI-Y // YELLOW INK
- CI-Color // INTEGRATED COLOR INK
- CI-Photo // INTEGRATED PHOTO INK Definition: Direction
Node Type: Value
Data Type: String
Description: DIRECTION OF ARRANGEMENT OF INK TANKS
Full Schema Path: ¥Printer.InkInfo.[Color]:Direction
Allowed Values: ORIGIN IS LOCATED AT LOWER LEFT OF PRINTER
- LeftRight  // LEFT TO RIGHT
- FrontBack  // FRONT TO REAR
- BottomTop  // BOTTOM TO TOP Definition: Order
Node Type: Value
Data Type: Int
Description: ORDER OF INK TANK FROM ORIGIN
Full Schema Path: ¥Printer.InkInfo.[Color]:Order
Examples:
- 1 // FIRST
- 2 // SECOND

FIG. 7

| | | |
|---|---|---|
| <Enumeration> | | |
| -Query(Schema)- | -Retrieve(Schema)- | -Retrieve(Value)- |
| ¥Printer.InkInfo | | |
| | ¥Printer.InkInfo.Black:Installed | True |
| | ¥Printer.InkInfo.Black:State | Full |
| | ¥Printer.InkInfo.Black:ModelName | CI-B |
| | ¥Printer.InkInfo.Black:Direction | LeftRight |
| | ¥Printer.InkInfo.Black:Order | 1 |
| | ¥Printer.InkInfo.Cyan:Installed | True |
| | ¥Printer.InkInfo.Cyan:State | Low |
| | ¥Printer.InkInfo.Cyan:ModelName | CI-C |
| | ¥Printer.InkInfo.Cyan:Direction | LeftRight |
| | ¥Printer.InkInfo.Cyan:Order | 2 |
| | ¥Printer.InkInfo.Magenta:Installed | True |
| | ¥Printer.InkInfo.Magenta:State | Out |
| | ¥Printer.InkInfo.Magenta:ModelName | CI-M |
| | ¥Printer.InkInfo.Magenta:Direction | LeftRight |
| | ¥Printer.InkInfo.Magenta:Order | 3 |
| | ¥Printer.InkInfo.Yellow:Installed | True |
| | ¥Printer.InkInfo.Yellow:State | Full |
| | ¥Printer.InkInfo.Yellow:ModelName | CI-Y |
| | ¥Printer.InkInfo.Yellow:Direction | LeftRight |
| | ¥Printer.InkInfo.Yellow:Order | 4 |

FIG. 8

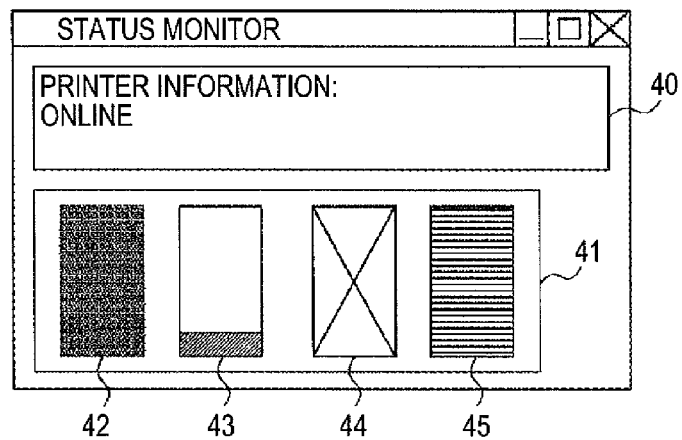

FIG. 9

| <Enumeration> -Query(Schema)- ¥Printer.InkInfo | -Retrieve(Schema)- | -Retrieve(Value)- |
|---|---|---|
| | ¥Printer.InkInfo.Color:Installed | True |
| | ¥Printer.InkInfo.Color:State | Low |
| | ¥Printer.InkInfo.Color:ModelName | CI-Color |
| | ¥Printer.InkInfo.Color:Direction | FrontBack |
| | ¥Printer.InkInfo.Color:Order | 1 |
| | ¥Printer.InkInfo.Black:Installed | True |
| | ¥Printer.InkInfo.Black:State | Full |
| | ¥Printer.InkInfo.Black:ModelName | CI-B |
| | ¥Printer.InkInfo.Black:Direction | FrontBack |
| | ¥Printer.InkInfo.Black:Order | 2 |

FIG. 10

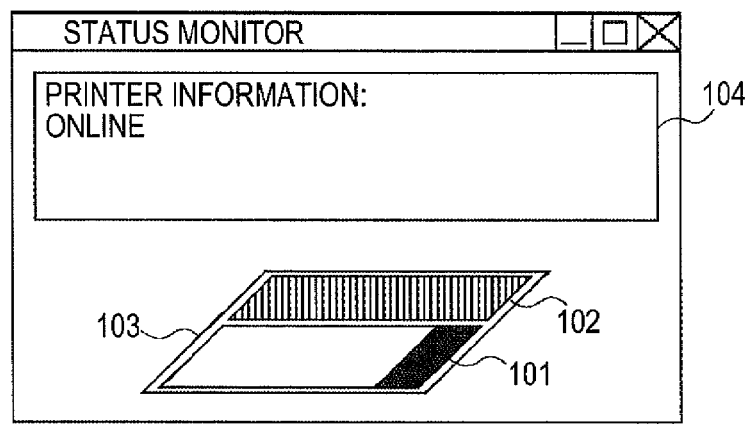

FIG. 11

```
<Enumeration>
-Query(Schema)-        -Retrieve(Schema)-              -Retrieve(Value)-
¥Printer.InkInfo
                       ¥Printer.InkInfo.Color:Installed    True
                       ¥Printer.InkInfo.Color:State        Full
                       ¥Printer.InkInfo.Color:ModelName    Cl-Color
                       ¥Printer.InkInfo.Color:Direction    BottomTop
                       ¥Printer.InkInfo.Color:Order        1
                       ¥Printer.InkInfo.Photo:Installed    True
                       ¥Printer.InkInfo.Photo:State        Low
                       ¥Printer.InkInfo.Photo:ModelName    Cl-Photo
                       ¥Printer.InkInfo.Photo:Direction    BottomTop
                       ¥Printer.InkInfo.Photo:Order        2
```

FIG. 13

-REQUEST COMMAND SUBMITTED FROM PC-
Ink;

-INK INFORMATION RETURNED FROM PRINTER-
Ink:Black.CI-B.Full,Cyan.CI-C.Low,Magenta.CI-M.Out,Yellow.CI-Y.Full;

FIG. 14

-REQUEST COMMAND SUBMITTED FROM PC-
Ink;

-INK INFORMATION RETURNED FROM PRINTER-
Ink:Black.CI-B.Full.LeftRight.1,Cyan.CI-C.Low.LeftRight.2,Magenta.CI-M.Out.LeftRight.3,Yellow.CI-Y.Full.LeftRight.4;

FIG. 20

| | |
|---|---|
| Definition: | InkInfo |
| Node Type: | Property |
| Description: | INK INFORMATION |
| Full Schema Path: | ¥Printer.InkInfo |
| Definition: | [Color] |
| Node Type: | Property |
| Description: | COLOR INFORMATION |
| Full Schema Path: | ¥Printer.InkInfo.[Color] |
| Allowed Values: | Black            // BLACK |
| | Cyan             // CYAN |
| | Magent           // MAGENTA |
| | Yellow           // YELLOW |
| | Photo            // PHOTO |
| | Color            // COLOR |
| Definition: | Installed |
| Node Type: | Value |
| Data Type: | Boolean |
| Definition: | PRESENCE OF INK OF COLOR [Color] |
| Full Schema Path: | ¥Printer.InkInfo.[Color]:Installed |
| Allowed Values: | True             // MOUNTED |
| | False            // NOT MOUNTED |
| Definition: | Level |
| Node Type: | Value |
| Data Type: | Int |
| Description: | REMAINING INK LEVEL OF COLOR [Color] |
| Full Schema Path: | ¥Printer.InkInfo.[Color]:Level |
| Allowed Values: | 0 To 100         // REMAINING INK LEVEL IN PERCENT (%) |
| | -1               // UNKNOWN REMAINING INK LEVEL |
| Definition: | ModelName |
| Node Type: | Value |
| Data Type: | String |
| Description: | TYPE OF INK OF COLOR [Color] |
| Full Schema Path: | ¥Printer.InkInfo.[Color]:ModelName |
| Examples: | CI-B   // BLACK INK       CI-Y      // YELLOW INK |
| | CI-C   // CYAN INK        CI-Color  // COLOR INK |
| | CI-M   // MAGENTA INK     CI-Photo  // PHOTO INK |
| Definition: | Direction |
| Node Type: | Value |
| Data Type: | String |
| Description: | DIRECTION OF ARRANGEMENT OF INK TANK OF COLOR [Color] |
| Full Schema Path: | ¥Printer.InkInfo.[Color]:Direction |
| Allowed Values: | ORIGIN IS LOCATED AT LOWER LEFT OF PRINTER |
| | LeftRight        // LEFT TO RIGHT |
| | FrontBack        // FRONT TO REAR |
| | BottomTop        // BOTTOM TO TOP |
| Definition: | Order |
| Node Type: | Value |
| Data Type: | Int |
| Description: | ORDER OF INK TANK OF COLOR [Color] FROM ORIGIN |
| Full Schema Path: | ¥Printer.InkInfo.[Color]:Order |
| Examples: | 1                // FIRST |
| | 2                // SECOND |

FIG. 21

| | |
|---|---|
| Definition: | Image |
| Node Type: | Value |
| Data Type: | Bitmap |
| Description: | INK IMAGE OF COLOR [Color] |
| Full Schema Path: | ¥Printer.InkInfo.[Color]:Image |
| Allowed Values: | BITMAP FILE (BINARY DATA) |

FIG. 22

<Enumeration>

| -Query(Schema)- | -Retrieve(Schema)- | -Retrieve(Value)- |
|---|---|---|
| ¥Printer.InkInfo | | |
| | ¥Printer.InkInfo.Black:Installed | True |
| | ¥Printer.InkInfo.Black:Level | 80 |
| | ¥Printer.InkInfo.Black:ModelName | CI-B |
| | ¥Printer.InkInfo.Black:Direction | LeftRight |
| | ¥Printer.InkInfo.Black:Order | 1 |
| | ¥Printer.InkInfo.Black:Image | CI-B.bmp |
| | ¥Printer.InkInfo.Yellow:Installed | True |
| | ¥Printer.InkInfo.Yellow:Level | 50 |
| | ¥Printer.InkInfo.Yellow:ModelName | CI-Y |
| | ¥Printer.InkInfo.Yellow:Direction | LeftRight |
| | ¥Printer.InkInfo.Yellow:Order | 2 |
| | ¥Printer.InkInfo.Yellow:Image | CI-Y.bmp |
| | ¥Printer.InkInfo.Magenta:Installed | True |
| | ¥Printer.InkInfo.Magenta:Level | 0 |
| | ¥Printer.InkInfo.Magenta:ModelName | CI-M |
| | ¥Printer.InkInfo.Magenta:Direction | LeftRight |
| | ¥Printer.InkInfo.Magenta:Order | 3 |
| | ¥Printer.InkInfo.Magenta:Image | CI-M.bmp |
| | ¥Printer.InkInfo.Cyan:Installed | True |
| | ¥Printer.InkInfo.Cyan:Level | 100 |
| | ¥Printer.InkInfo.Cyan:ModelName | CI-C |
| | ¥Printer.InkInfo.Cyan:Direction | LeftRight |
| | ¥Printer.InkInfo.Cyan:Order | 4 |
| | ¥Printer.InkInfo.Cyan:Image | CI-C.bmp |

FIG. 26

| | | |
|---|---|---|
| <Enumeration> -Query(Schema)- ¥Printer.InkInfo | -Retrieve(Schema)- | -Retrieve(Value)- |
| | ¥Printer.InkInfo.Color:Installed | True |
| | ¥Printer.InkInfo.Color:Level | 40 |
| | ¥Printer.InkInfo.Color:ModelName | CI-Color |
| | ¥Printer.InkInfo.Color:Direction | BottomTop |
| | ¥Printer.InkInfo.Color:Order | 1 |
| | ¥Printer.InkInfo.Color:Image | CI-Color.bmp |
| | ¥Printer.InkInfo.Photo:Installed | True |
| | ¥Printer.InkInfo.Photo:Level | 80 |
| | ¥Printer.InkInfo.Photo:ModelName | CI-Photo |
| | ¥Printer.InkInfo.Photo:Direction | BottomTop |
| | ¥Printer.InkInfo.Photo:Order | 2 |
| | ¥Printer.InkInfo.Photo:Image | CI-Photo.bmp |

Definition: ImageData
Node Type: Property
Description: IMAGE INFORMATION ABOUT INK OF COLOR [Color]
Full Schema Path: ¥Printer.InkInfo.[Color].ImageData Definition: Red
Node Type: Value
Data Type: Int
Description: RED COMPONENT OF INK IMAGE OF COLOR [Color]
Full Schema Path: ¥Printer.InkInfo.[Color].ImageData:Red
Allowed Values: 0 To 255

Definition: Green
Node Type: Value
Data Type: Int
Description: GREEN COMPONENT OF INK IMAGE OF COLOR [Color]
Full Schema Path: ¥Printer.InkInfo.[Color].ImageData:Green
Allowed Values: 0 To 255

Definition: Blue
Node Type: Value
Data Type: Int
Description: BLUE COMPONENT OF INK IMAGE OF COLOR [Color]
Full Schema Path: ¥Printer.InkInfo.[Color].ImageData:Blue
Allowed Values: 0 To 255

Definition: Width
Node Type: Value
Data Type: Int
Description: WIDTH OF INK IMAGE OF COLOR [Color]
Full Schema Path: ¥Printer.InkInfo.[Color].ImageData:Width
Allowed Values: 0 To 100

Definition: Depth
Node Type: Value
Data Type: Int
Description: DEPTH OF INK IMAGE OF COLOR [Color]
Full Schema Path: ¥Printer.InkInfo.[Color].ImageData:Depth
Allowed Values: 0 To 100

Definition: Height
Node Type: Value
Data Type: Int
Description: HEIGHT OF INK IMAGE OF COLOR [Color]
Full Schema Path: ¥Printer.InkInfo.[Color].ImageData:Height
Allowed Values: 0 To 100

FIG. 31

| ‹Enumeration› -Query(Schema)- ¥Printer.InkInfo | -Retrieve(Schema)- | -Retrieve(Value)- |
|---|---|---|
| | ¥Printer.InkInfo.Black:Installed | True |
| | ¥Printer.InkInfo.Black:Level | 80 |
| | ¥Printer.InkInfo.Black:ModelName | CI-B |
| | ¥Printer.InkInfo.Black:Direction | LeftRight |
| | ¥Printer.InkInfo.Black:Order | 1 |
| | ¥Printer.InkInfo.Black:ImageData:Red | 0 |
| | ¥Printer.InkInfo.Black:ImageData:Green | 0 |
| | ¥Printer.InkInfo.Black:ImageData:Blue | 0 |
| | ¥Printer.InkInfo.Black:ImageData:Width | 65 |
| | ¥Printer.InkInfo.Black:ImageData:Depth | 100 |
| | ¥Printer.InkInfo.Black:ImageData:Height | 75 |
| | ¥Printer.InkInfo.Yellow:Installed | True |
| | ¥Printer.InkInfo.Yellow:Level | 50 |
| | ¥Printer.InkInfo.Yellow:ModelName | CI-Y |
| | ¥Printer.InkInfo.Yellow:Direction | LeftRight |
| | ¥Printer.InkInfo.Yellow:Order | 2 |
| | ¥Printer.InkInfo.Yellow:ImageData:Red | 255 |
| | ¥Printer.InkInfo.Yellow:ImageData:Green | 255 |
| | ¥Printer.InkInfo.Yellow:ImageData:Blue | 0 |
| | ¥Printer.InkInfo.Yellow:ImageData:Width | 25 |
| | ¥Printer.InkInfo.Yellow:ImageData:Depth | 100 |
| | ¥Printer.InkInfo.Yellow:ImageData:Height | 75 |
| | ¥Printer.InkInfo.Magenta:Installed | True |
| | ¥Printer.InkInfo.Magenta:Level | 0 |
| | ¥Printer.InkInfo.Magenta:ModelName | CI-M |
| | ¥Printer.InkInfo.Magenta:Direction | LeftRight |
| | ¥Printer.InkInfo.Magenta:Order | 3 |
| | ¥Printer.InkInfo.Magenta:ImageData:Red | 255 |
| | ¥Printer.InkInfo.Magenta:ImageData:Green | 0 |
| | ¥Printer.InkInfo.Magenta:ImageData:Blue | 255 |
| | ¥Printer.InkInfo.Magenta:ImageData:Width | 25 |
| | ¥Printer.InkInfo.Magenta:ImageData:Depth | 100 |
| | ¥Printer.InkInfo.Magenta:ImageData:Height | 75 |
| | ¥Printer.InkInfo.Cyan:Installed | True |
| | ¥Printer.InkInfo.Cyan:Level | 100 |
| | ¥Printer.InkInfo.Cyan:ModelName | CI-C |
| | ¥Printer.InkInfo.Cyan:Direction | LeftRight |
| | ¥Printer.InkInfo.Cyan:Order | 4 |
| | ¥Printer.InkInfo.Cyan:ImageData:Red | 0 |
| | ¥Printer.InkInfo.Cyan:ImageData:Green | 255 |
| | ¥Printer.InkInfo.Cyan:ImageData:Blue | 255 |
| | ¥Printer.InkInfo.Cyan:ImageData:Width | 25 |
| | ¥Printer.InkInfo.Cyan:ImageData:Depth | 100 |
| | ¥Printer.InkInfo.Cyan:ImageData:Height | 75 |

FIG. 32

| INK COLOR | DIRECTION | ORDER | IMAGE | IMAGE DATA |
|---|---|---|---|---|
| BLACK | LEFT RIGHT | 1 | CI-B.bmp | 0,0,0,65,100,75 |
| YELLOW | LEFT RIGHT | 2 | CI-Y.bmp | 255,255,0,25,100,75 |
| MAGENTA | LEFT RIGHT | 3 | CI-M.bmp | 255,0,255,25,100,75 |
| CYAN | LEFT RIGHT | 4 | CI-C.bmp | 0,255,255,25,100,75 |

FIG. 33

| INK COLOR | DIRECTION | ORDER | IMAGE |
|---|---|---|---|
| COLOR | BOTTOM TOP | 1 | CI-Color.bmp |
| PHOTO | BOTTOM TOP | 2 | CI-Photo.bmp |

FIG. 34

−REQUEST COMMAND SUBMITTED FROM PC−

Ink;

−INK INFORMATION RETURNED FROM PRINTER−

Ink:Black.CI-B.80,Yellow.CI-Y.50,Magenta.CI-M.0,Cyan.CI-C.100;

FIG. 35

−REQUEST COMMAND SUBMITTED FROM PC−

Ink;

−INK INFORMATION RETURNED FROM PRINTER−

Ink:Black.CI-B.80.LeftRight.1."CI-B.bmp",
Yellow.CI-Y.50.LeftRight.2."CI-Y.bmp",
Magenta.CI-M.0.LeftRight.3."CI-M.bmp",
Cyan.CI-C.100.LeftRight.4."CI-C.bmp";

FIG. 36

-REQUEST COMMAND SUBMITTED FROM PC-

Ink;

-INK INFORMATION RETURNED FROM PRINTER-

Ink:Black.CI-B.80.LeftRight.1.0.0.0.65.100.75,
Yellow.CI-Y.50.LeftRight.2.255.255.0.25.100.75,
Magenta.CI-M.0.LeftRight.3.255.0.255.25.100.75,
Cyan.CI-C.100.LeftRight.4.0.255.255.25.100.75;

FIG. 37

-REQUEST COMMAND SUBMITTED FROM PC-

Ink;

-INK INFORMATION RETURNED FROM PRINTER-

Ink:Color.CI-Color.40,Photo.CI-Photo.80;

FIG. 38

-REQUEST COMMAND SUBMITTED FROM PC-

Ink;

-INK INFORMATION RETURNED FROM PRINTER-

Ink:Color.CI-Color.40.BottomTop.1."CI-Color.bmp",
Photo.CI-Photo.80.BottomTop.2."CI-Photo.bmp";

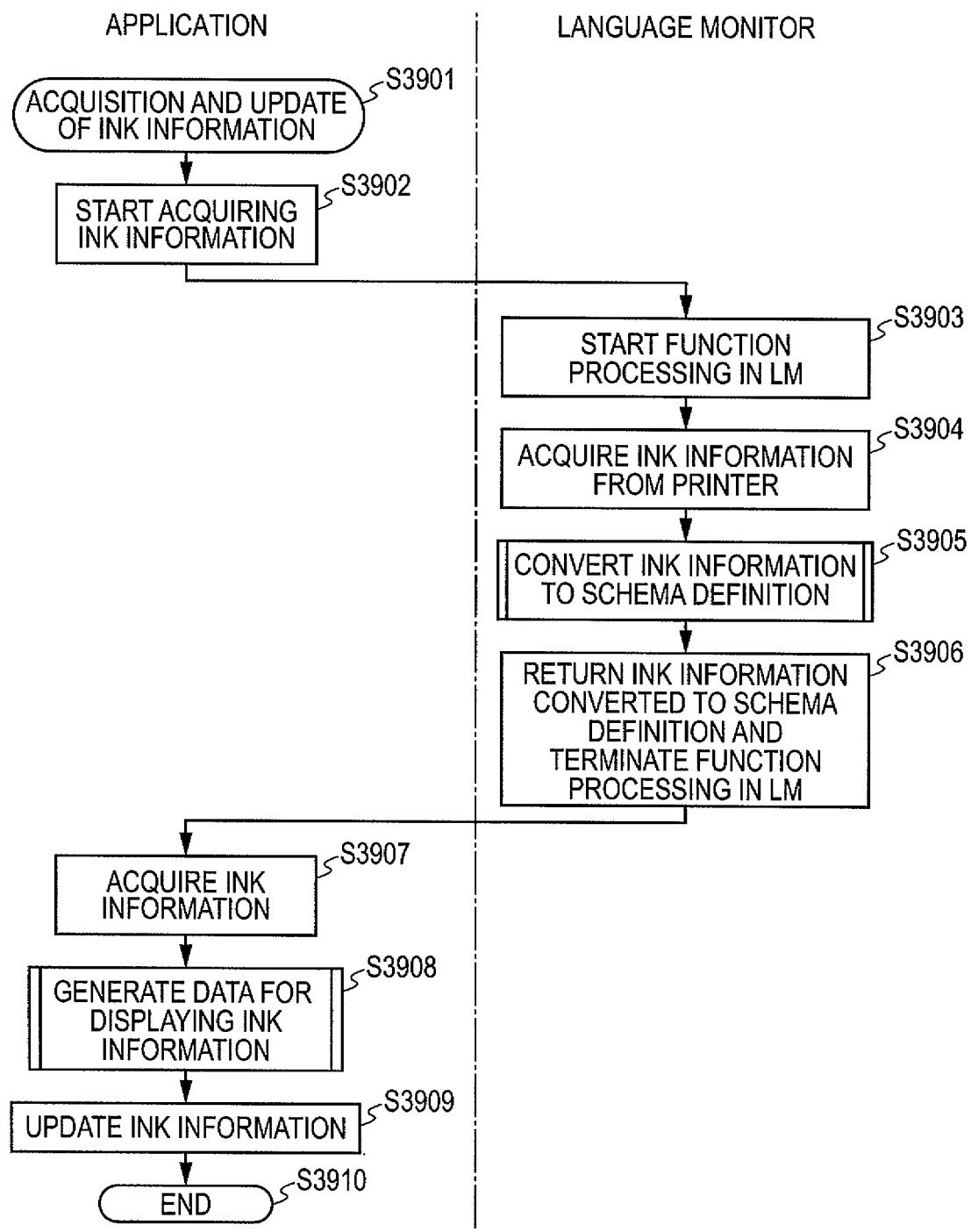

FIG. 43

```
Definition: InkInfo
Node Type:Property
Description:           INK INFORMATION
Full Schema Path:      \Printer.InkInfo
Definition:[Color]
Node Type:Property
Description:           COLOR INFORMATION
Full Schema Path:      \Printer.InkInfo.[Color]
Allowed Values:        Black      // BLACK       Yellow      // YELLOW
                       Cyan       // CYAN        Photo       // PHOTO
                       Magenta    // MAGENTA     Color       // COLOR Definition: Installed
Node Type:Value
Data Type:Boolean
Description:           PRESENCE OF INK OF COLOR [Color]
Full Schema Path:      \Printer.InkInfo.[Color]:Installed
Allowed Values:        True                      // MOUNTED
                       False                     // NOT MOUNTED Definition: State
Node Type:Value
Data Type:String
Description:           REMAINING INK LEVEL OF COLOR [Color]
Full Schema Path:      \Printer.InkInfo.[Color]:State
Allowed Values:        Full    // INK FULL         Out      // INK EMPTY
                       Low     // LOW REMAINING    Unknown  // UNKNOWN REMAINING
                               INK LEVEL                    INK LEVEL Definition: ModelName
Node Type:Value
Data Type:String
Description:           TYPE OF INK OF COLOR [Color]
Full Schema Path:      \Printer.InkInfo.[Color]:ModelName
Examples               CI-B     // BLACK INK       CI-Y      // YELLOW INK
                       CI-C     // CYAN INK        CI-Color  // INTEGRATED COLOR INK
                       CI-M     // MAGENTA INK     CI-Photo  // INTEGRATED PHOTO INK Definition: Direction
Node Type:Value
Data Type:String
Description:           DIRECTION OF ARRANGEMENT OF INK TANKS
Full Schema Path:      \Printer.InkInfo.[Color]:Direction
Allowed Values:        ORIGIN IS LOCATED AT LOWER LEFT OF PRINTER
                       LeftRight             // LEFT TO RIGHT
                       FrontBack             // FRONT TO REAR
                       BottomTop             // BOTTOM TO TOP Definition: Order
Node Type:Value
Data Type:Int
Description:           ORDER OF INK TANK FROM ORIGIN
Full Schema Path:      \Printer.InkInfo.[Color]:Order
Examples               1                     // FIRST
                       2                     // SECOND Definition: InsertDirection
Node Type:Value
Data Type:String
Description:           DIRECTION OF INK TANK INSERTION
Full Schema Path:      \Printer.InkInfo.[Color]:InsertDirection
Allowed Values:        LeftToRight           // LEFT TO RIGHT
                       RightToLeft           // RIGHT TO LEFT
                       FrontToBack           // FRONT TO REAR
                       BackToFront           // REAR TO FRONT
                       ButtomToTop           // BOTTOM TO TOP
                       TopToButton           // TOP TO BOTTOM
```

FIG. 44

```
<Enumeration>
-Query(Schema)-              -Retrieve(Schema)-                        -Retrieve(Value)-
\Printer.InkInfo
                             \Printer.InkInfo.Black:Installed          True
                             \Printer.InkInfo.Black:State              Out
                             \Printer.InkInfo.Black:ModelName          CI-B
                             \Printer.InkInfo.Black:Direction          LeftRight
                             \Printer.InkInfo.Black:Order              1
                             \Printer.InkInfo.Black:InsertDirection    ButtomToTop \Printer.InkInfo.Color:Installed          True
                             \Printer.InkInfo.Color:State              Out
                             \Printer.InkInfo.Color:ModelName          CI-Color
                             \Printer.InkInfo.Color:Direction          LeftRight
                             \Printer.InkInfo.Color:Order              2
                             \Printer.InkInfo.Color:InsertDirection    ButtomToTop
```

FIG. 45

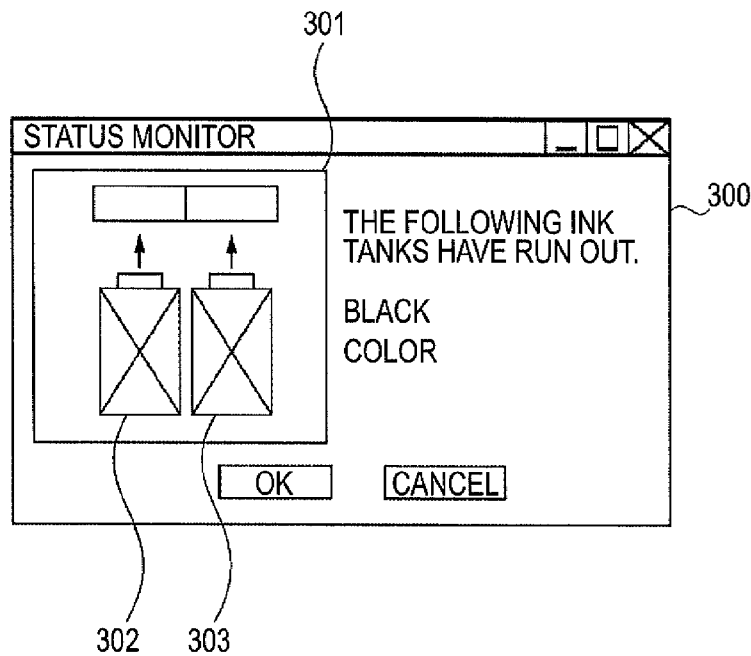

FIG. 46

<Enumeration>
-Query(Schema)-
\Printer.InkInfo

| -Retrieve(Schema)- | -Retrieve(Value)- |
|---|---|
| \Printer.InkInfo.Black:Installed | True |
| \Printer.InkInfo.Black:State | Full |
| \Printer.InkInfo.Black:ModelName | CI-B |
| \Printer.InkInfo.Black:Direction | BottomTop |
| \Printer.InkInfo.Black:Order | 2 |
| \Printer.InkInfo.Black:InsertDirection | LeftToRight |
| | |
| \Printer.InkInfo.Color:Installed | True |
| \Printer.InkInfo.Color:State | Out |
| \Printer.InkInfo.Color:ModelName | CI-Color |
| \Printer.InkInfo.Color:Direction | BottomTop |
| \Printer.InkInfo.Color:Order | 1 |
| \Printer.InkInfo.Color:InsertDirection | LeftToRight |

FIG. 47

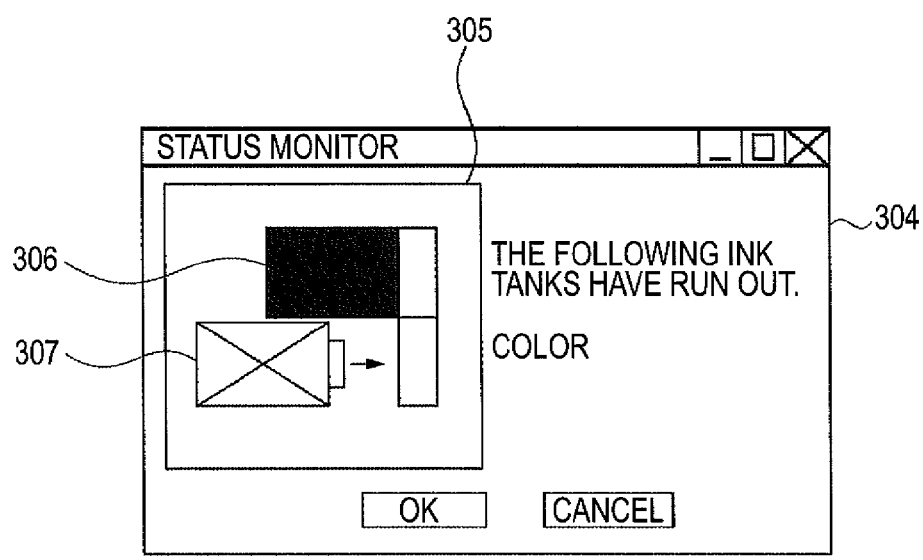

FIG. 48

-REQUEST COMMAND SUBMITTED FROM PC-

Ink;

-INK INFORMATION RETURNED FROM PRINTER-

Ink:Black.CI-B.Out.LeftRight.1,Color.CI-Color. Out. LeftRight.2;

FIG. 49

-REQUEST COMMAND SUBMITTED FROM PC-

Ink;

-INK INFORMATION RETURNED FROM PRINTER-

Ink:Black.CI-B.Out.LeftRight.1.ButtomToTop,Color.CI-Color Out LeftRight.1.ButtomToTop;

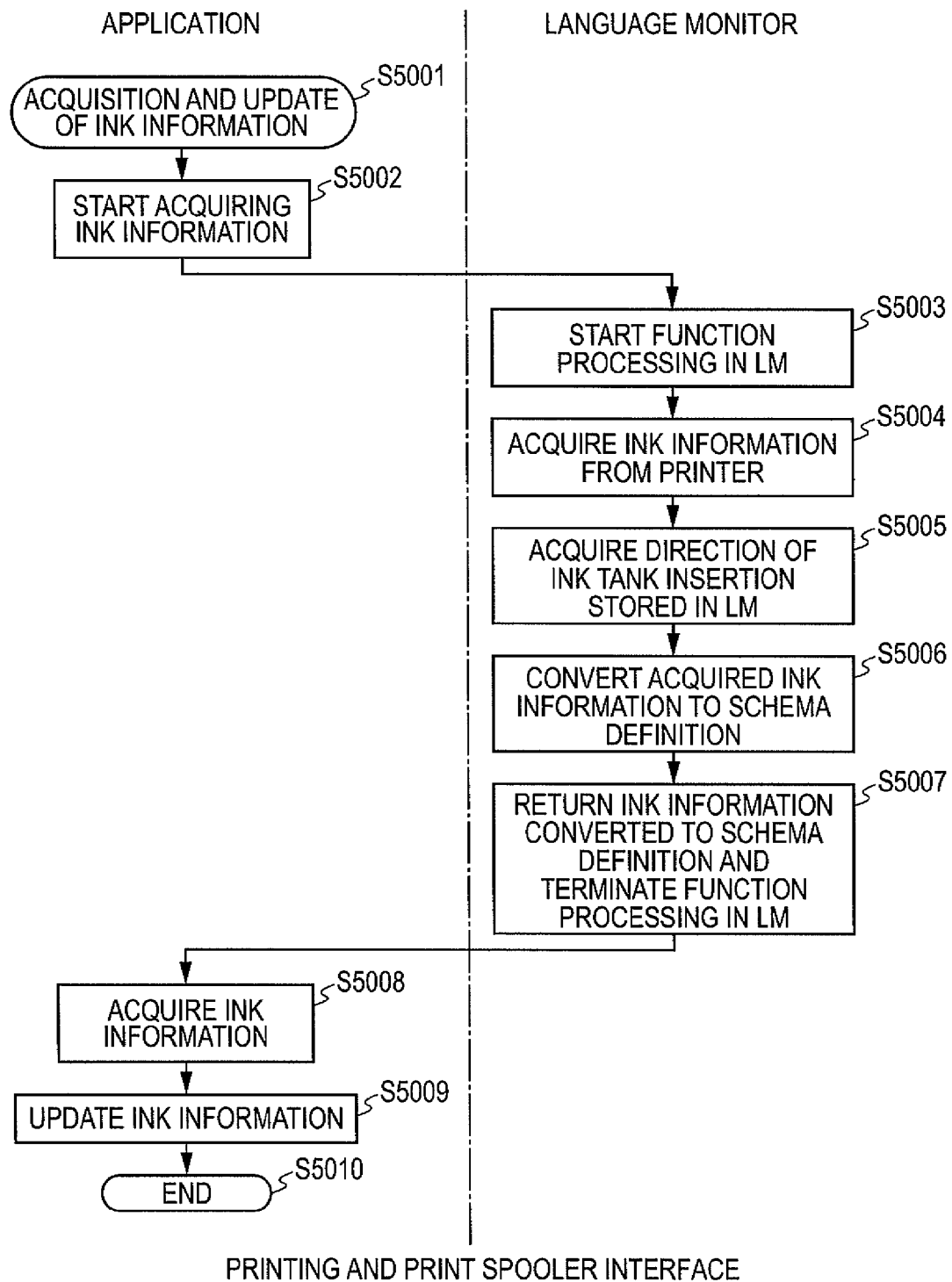

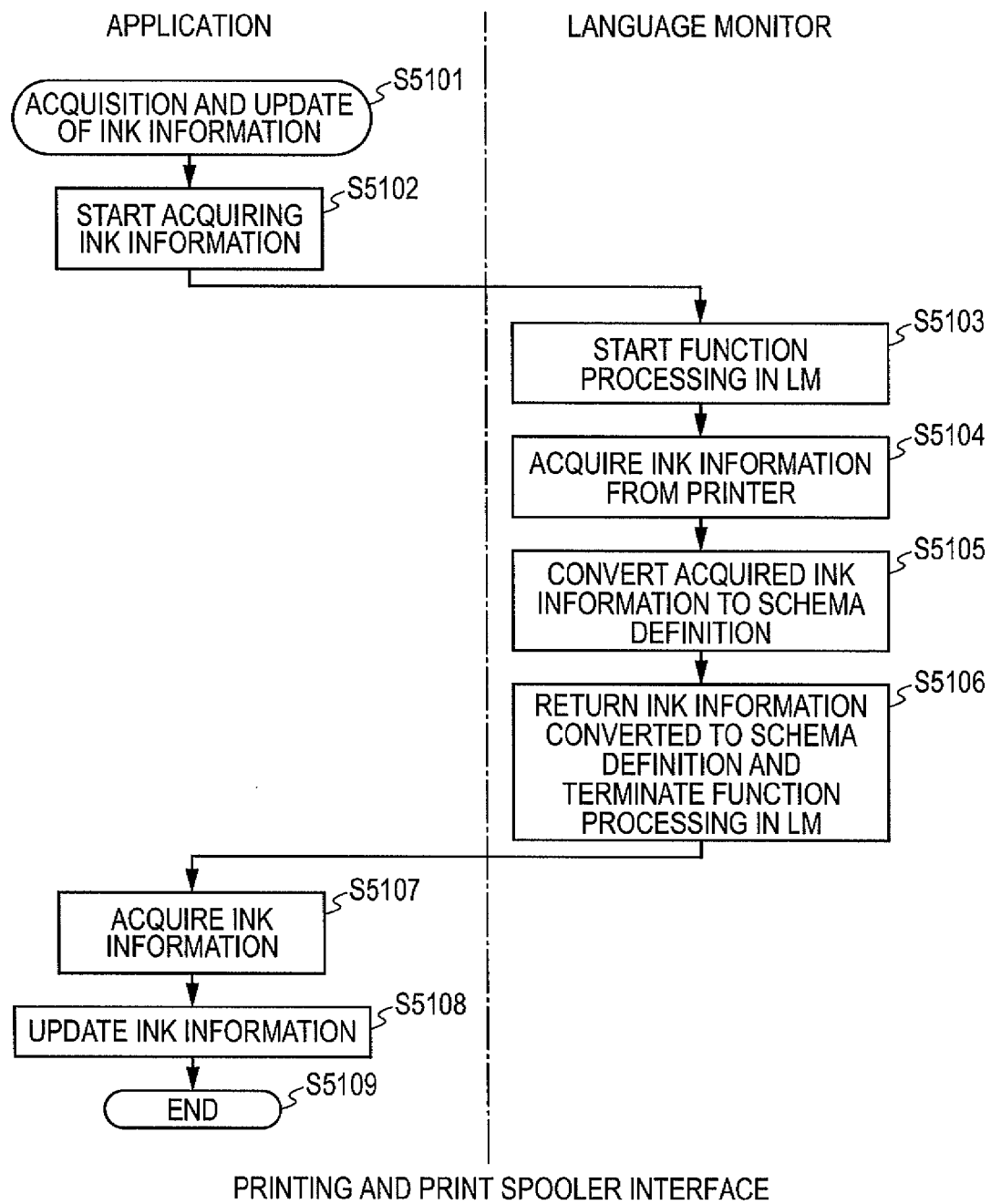

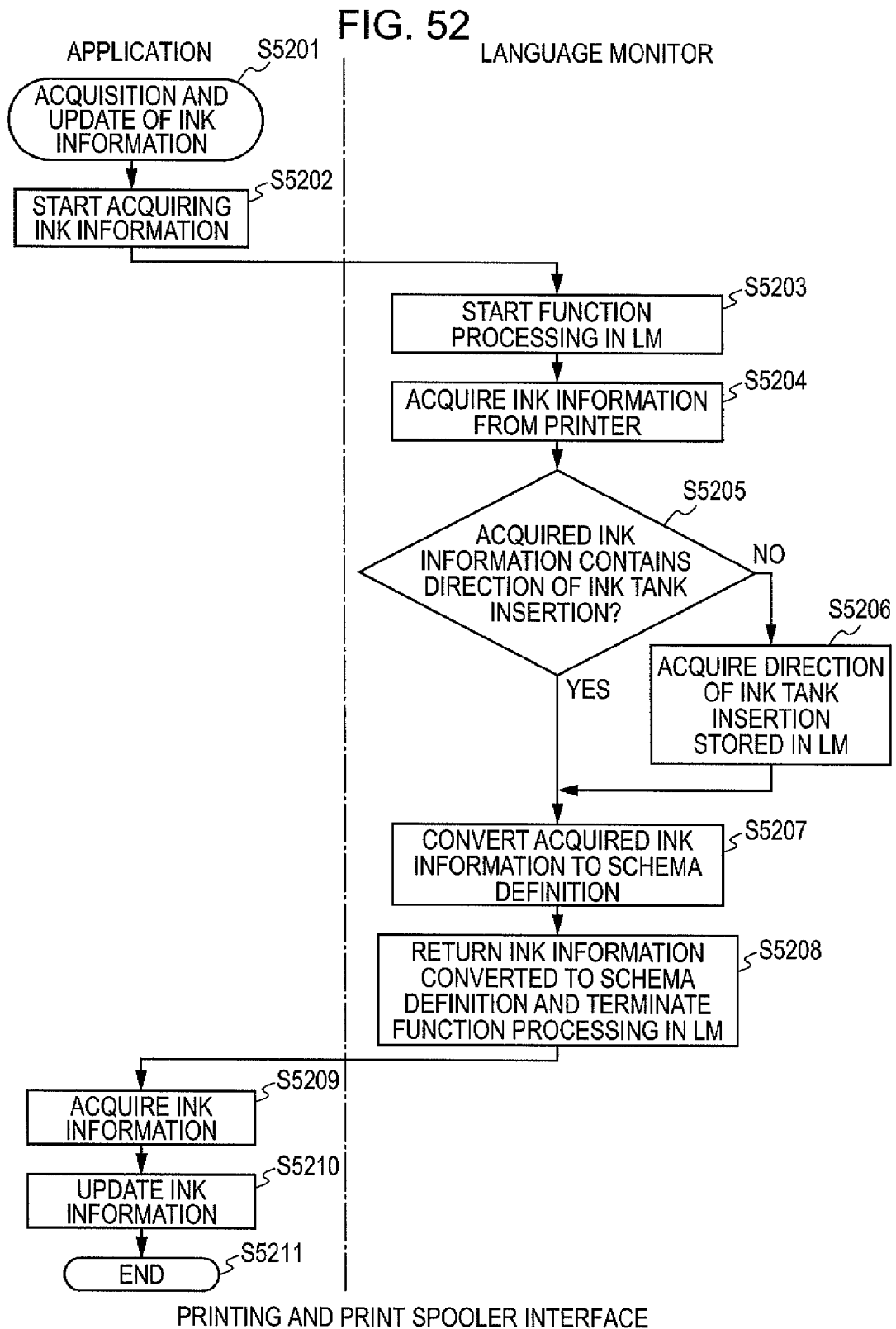

PERIPHERAL DEVICE CONTROL SYSTEM, PRINTING DEVICE, PERIPHERAL DEVICE CONTROL METHOD, AND PROGRAM FOR PROVIDING INFORMATION REGARDING AN AMOUNT OF COLOR MATERIAL

CROSS REFERENCE TO RELATED APPLICATIONS

This application is a Continuation of U.S. patent application Ser. No. 14/591,846 filed Jan. 7, 2015, which is a Continuation of U.S. Pat. No. 8,947,694, which claims priority to Japanese Patent Application No. 2005-280107 filed Sep. 27, 2005, and Japanese Patent Application No. 2004-364441, filed Dec. 16, 2004, all of which are hereby incorporated by reference herein in their entireties.

BACKGROUND OF THE INVENTION

Field of the Invention

The present invention relates to a technology capable of controlling a peripheral device, such as a printer, via a network.

Description of the Related Art

Recently, network-based peripheral devices, such as printers, copiers, facsimiles, scanners, digital cameras, and image processing apparatuses, including the composite function of these devices, have become widespread as network infrastructure has been improved. With the widespread use of network-based peripheral devices, third parties, which have no relation to a manufacturer of the peripheral device, distributes (sells) to users an application which controls these network-based peripheral devices and monitors the status of these network-based peripheral devices.

For example, Japanese Patent Laid-Open No. 09-152946 discloses an information processing apparatus including an application (a status monitor) that displays ink information of a printer (peripheral device) connected to the information processing apparatus via a network in real time.

Also, Japanese Patent Laid-Open No. 08-118675 (corresponding to U.S. Pat. No. 6,771,378), for example, discloses an information processing apparatus and method in which a printer (peripheral device) detects a remaining ink level, converts it to a control command, and transmits the control command to the information processing apparatus, and the information processing apparatus displays the remaining ink level.

In the above-described known examples, an application (status monitor) can hold resources, such as bitmaps of images about ink, and can display the shape, color, size, arrangement direction, order of the arrangement, and a remaining ink level of an ink tank, using accurate and visually realistic graphics. However, to provide such a display, the application needs to know the shape, color, size, arrangement direction, order of the arrangement, and a remaining ink level of an ink tank in advance and needs to hold resources such as bitmaps of images for displaying amounts of remaining ink in a plurality of stages in advance. As used herein, the term "realistic graphics" refers to graphics in which the shape of a replaceable ink tank and a color of the ink are displayed in a visually realistic manner by using accurate and high-fidelity images even when the shape of a replaceable ink tank and a color of the ink is different for different vendors or different models or even when a color of the ink (e.g., cyan) is slightly different for different vendors.

A vendor of a printer can easily obtain such printer information required for an application (e.g., status monitor) and the application can use the information to control the printer. Accordingly, the vendor can provide an application having the above-described specification for a printer whose information required for the specification can be obtained. However, even for the application of the printer vendor, when the application supports a new printer, the vendor needs to obtain the above-described required information again and needs to update the application on the basis of the obtained information.

Additionally, in the above-described known examples, when a third party cannot acquire the above-described required information from a printer vendor, an application from the third party cannot hold the required information. Although the application can display a character string indicating a remaining ink level by using the Bidi Communications Schema of Windows® XP, which is described below, the application cannot display the shape, color, size, arrangement direction, the remaining ink level of an ink tank in detail using accurate and visually realistic graphics. Furthermore, even if the application can display such information, the application must limit the target printers, which is a problem.

Still furthermore, in the above-described known examples, by obtaining the above-described information to control the application, the shape, color, size, arrangement direction, order of the arrangement, and remaining ink level of an ink tank can be displayed in detail using accurate and visually realistic graphics. However, since the application uses resources, such as bitmaps of images about ink, the information is displayed two dimensionally. If the information is displayed three dimensionally, the process of the application becomes significantly complicated, and therefore, it is difficult to realize the three-dimensional display.

SUMMARY OF THE INVENTION

The present invention provides a technology that allows any application, including an application developed by a third party not related to a vendor of a peripheral device, to display information about the peripheral device. For example, information about an ink tank installed in a printer (i.e., the shape, color, arrangement direction, order of the arrangement, remaining ink level of an ink tank) is displayed using accurate and visually realistic graphics. The present invention also provides a peripheral device control system that can easily provide three-dimensional representation.

According to an embodiment of the present invention, a peripheral device control system includes an information processing apparatus including a peripheral device control unit and an application and a peripheral device connected to the information processing apparatus. The peripheral device control unit provides the application with information about an amount of remaining consumable supply and the arrangement of the consumable supply in the peripheral device, and the application displays the amount of remaining consumable supply along with the arrangement of the consumable supply on the basis of the information about the amount of remaining consumable supply and the arrangement of the consumable supply received from the peripheral device control unit.

According to another embodiment of the present invention, a peripheral device control system includes an information processing apparatus including a peripheral device control unit and an application and a peripheral device connected to the information processing apparatus. The peripheral device transfers information about an amount of remaining consumable supply and the arrangement of the consumable supply to the peripheral device control unit, in response to a request from the peripheral device control unit, and the peripheral device control unit transfers the information about an amount of remaining consumable supply and the arrangement of the consumable supply received from the peripheral device to the application. The application displays the amount of remaining consumable supply along with the arrangement of the consumable supply on the basis of the information about an amount of remaining consumable supply and the arrangement of the consumable supply received from the peripheral device control unit.

According to another embodiment of the present invention, a method for controlling a peripheral device in an information processing apparatus connected to the peripheral device and including a peripheral device control unit and an application includes the steps of converting, by the peripheral device control unit, information about an amount of remaining consumable supply and an arrangement of the consumable supply in the peripheral device to a schema definition and providing the application with the schema definition, and displaying, by the application, the amount of remaining consumable supply along with the arrangement of the consumable supply on the basis of the information about the amount of remaining consumable supply and the arrangement of the consumable supply converted to the schema definition and provided from the peripheral device control unit.

According to another embodiment of the present invention, a method for controlling a peripheral device in an information processing apparatus connected to the peripheral device and including a peripheral device control unit and an application includes the steps of transferring, by the peripheral device, information about an amount of remaining consumable supply and the arrangement of the consumable supply to the peripheral device control unit in response to a request from the peripheral device control unit, converting, by the peripheral device control unit, the information about an amount of remaining consumable supply and the arrangement of the consumable supply received from the peripheral device to a schema definition and providing the application with the schema definition, and displaying, by the application, the amount of remaining consumable supply along with the arrangement of the consumable supply on the basis of the information about the amount of remaining consumable supply and the arrangement of the consumable supply converted to the schema definition and provided from the peripheral device control unit.

According to another embodiment of the present invention, a program executed in an information processing apparatus connected to a peripheral device includes program code for receiving information about an amount of remaining consumable supply and the arrangement of the consumable supply from the peripheral device and program code for converting the information about an amount of remaining consumable supply and the arrangement of the consumable supply in the peripheral device to a schema definition and transmitting the schema definition to an application.

According to another embodiment of the present invention, a program executed in an information processing apparatus connected to a peripheral device includes program code for receiving a schema definition converted from information about an amount of remaining consumable supply and the arrangement of the consumable supply of the peripheral device and program code for displaying the amount of remaining consumable supply along with the arrangement of the consumable supply on the basis of the information about the schema definition converted from the information about an amount of remaining consumable supply and the arrangement of the consumable supply received from the peripheral device.

According to another embodiment of the present invention, a printing apparatus includes reception means for receiving a request from an information processing apparatus and transmission means for transmitting information about the arrangement of consumable supply and an amount of remaining consumable supply in response to the received request from the information processing apparatus.

According to another embodiment of the present invention, a peripheral device control method in an information processing apparatus connected to a peripheral device and including a peripheral device control unit and an application includes the steps of providing, by the peripheral device control unit, the application with information about an amount of remaining consumable supply and the arrangement of the consumable supply and displaying, by the application, the amount of remaining consumable supply along with the arrangement of the consumable supply on the basis of the information about the amount of remaining consumable supply and the arrangement of the consumable supply received from the peripheral device control unit.

According to another embodiment of the present invention, a peripheral device control method in an information processing apparatus connected to a peripheral device and including a peripheral device control unit and an application includes the steps of transferring, from the peripheral device, information about an amount of remaining consumable supply and the arrangement of the consumable supply to the peripheral device control unit in response to a request from the peripheral device control unit, transferring, from the peripheral device control unit, the information about an amount of remaining consumable supply and the arrangement of the consumable supply received from the peripheral device to the application, and displaying, by the application, the amount of remaining consumable supply along with the arrangement of the consumable supply on the basis of the information received from the peripheral device control unit.

According to another embodiment of the present invention, a program executed in an information processing apparatus connected to a peripheral device includes program code for receiving information about an amount of remaining consumable supply and the arrangement of the consumable supply from the peripheral device and program code for transmitting the information about an amount of remaining consumable supply and the arrangement of the consumable supply in the peripheral device to an application.

According to another embodiment of the present invention, a program executed in an information processing apparatus connected to a peripheral device includes program code for receiving information about an amount of remaining consumable supply and the arrangement of the consumable supply in the peripheral device and program code for displaying the amount of remaining consumable supply along with the arrangement of the consumable supply on the basis of the received information about an amount of remaining consumable supply and the arrangement of the consumable supply in the peripheral device.

Further features of the present invention will become apparent from the following description of exemplary embodiments with reference to the attached drawings.

BRIEF DESCRIPTION OF THE DRAWINGS

FIG. 6 illustrates a diagram of exemplary schemas used by an application to acquire ink information and ink condition.

FIG. 7 illustrates a diagram of an exemplary schema and the values when ink information and ink condition are enumerated using the schema shown in FIG. 6.

FIG. 8 illustrates an example of graphical representation of remaining ink levels displayed by the application using the schema shown in FIG. 7.

FIG. 9 illustrates a diagram of an exemplary schema used when ink information and ink condition are acquired in a printer in which ink tanks are arranged in the front to rear direction.

FIG. 10 illustrates an example of graphical representation of remaining ink levels displayed by the application using the schema shown in FIG. 9.

FIG. 11 illustrates a diagram of an exemplary schema used when ink information and ink condition are acquired in a printer in which ink tanks are arranged in a vertical direction.

FIG. 13 illustrates a diagram of exemplary data for the PC to acquire ink information from a printer.

FIG. 14 illustrates a diagram of exemplary data for the PC to acquire ink information from a printer.

FIG. 20 is a diagram of an exemplary schema used by an application to acquire ink information and ink condition from a printer.

FIG. 21 is a diagram of an exemplary schema used when an application acquires ink information and ink condition.

FIG. 22 illustrates a diagram of an exemplary schema and the values when ink information and ink condition are enumerated using the schemas shown in FIGS. 20 and 21.

FIG. 26 illustrates a diagram of an exemplary schema and the values when ink information and ink condition are enumerated using the schemas shown in FIGS. 20 and 21.

FIG. 30 is a diagram of an exemplary schema used by an application to acquire ink information and ink condition from a printer.

FIG. 31 illustrates a diagram of an exemplary schema and the values when ink information and ink condition are enumerated using schemas shown in FIGS. 20 and 30.

FIG. 32 illustrates a diagram of an exemplary database of ink information.

FIG. 33 illustrates a diagram of another exemplary database of ink information.

FIG. 34 illustrates a diagram of exemplary data for a PC to acquire ink information from a printer.

FIG. 35 illustrates a diagram of exemplary data for a PC to acquire ink information from a printer.

FIG. 36 illustrates a diagram of exemplary data for a PC to acquire ink information from a printer.

FIG. 37 illustrates a diagram of exemplary data for a PC to acquire ink information from a printer.

FIG. 38 illustrates a diagram of exemplary data for a PC to acquire ink information from a printer.

FIG. 39 is a flow chart of an exemplary process for updating the display of ink information after an application acquires the ink information from a printer.

FIG. 43 illustrates diagrams of exemplary schemas used by an application to acquire ink information, ink condition, and a direction of ink tank insertion from a printer.

FIG. 44 illustrates a diagram of an exemplary schema and the values when ink information and ink condition are enumerated using the schemas shown in FIG. 43.

FIG. 45 is an exemplary display screen of an application when the application displays a remaining ink level and a direction of ink tank insertion using graphics and using the schemas shown in FIG. 44.

FIG. 46 illustrates a diagram of an exemplary schema and the values used when ink information and ink condition of a printer whose direction of ink tank insertion is from left to right are enumerated using the schema shown in FIG. 43.

FIG. 47 is an exemplary display screen of an application when the application displays a remaining ink level and a direction of ink tank insertion using graphics and using the schemas shown in FIG. 46.

FIG. 48 illustrates a diagram of exemplary data for a PC to acquire ink information from a printer.

FIG. 49 illustrates a diagram of exemplary data for a PC to acquire ink information from a printer.

FIG. 50 is a flow chart of an exemplary process for updating the display of ink information after an application acquires the ink information from a printer.

FIG. 51 is a flow chart of an exemplary process for updating the display of ink information after an application acquires the ink information from a printer.

FIG. 52 is a flow chart of an exemplary process for updating the display of ink information after an application acquires the ink information from a printer.

DESCRIPTION OF THE EMBODIMENTS

Numerous exemplary embodiments, features and aspects of the present invention are described with reference to the accompanying drawings.

First Exemplary Embodiment

Figure 1:
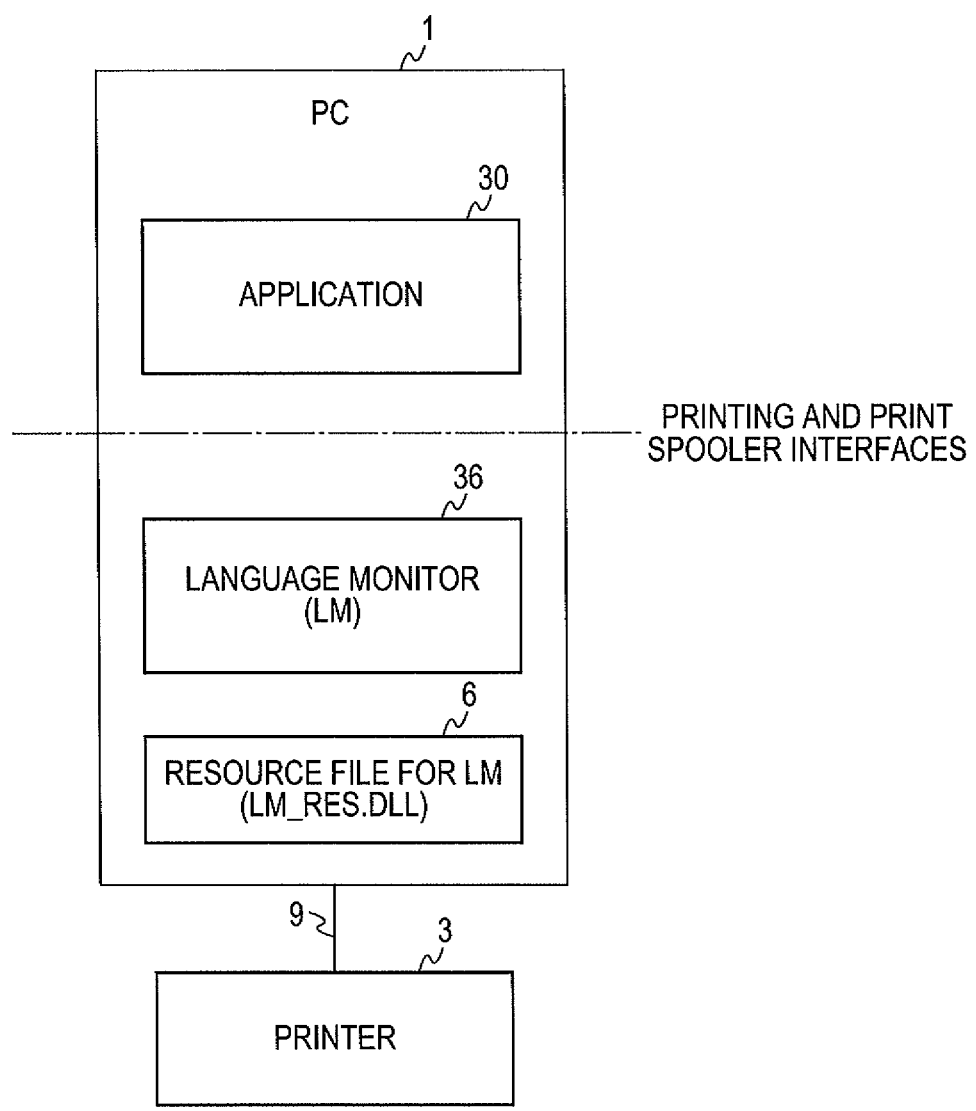
FIG. 1 illustrates a block diagram of an exemplary peripheral device control system including an information processing apparatus (PC) and a peripheral device according to a first embodiment of the present invention.

FIG. 1 illustrates a block diagram of an exemplary peripheral device control system including an information processing apparatus and a peripheral device according to a first embodiment of the present invention.

As shown in FIG. 1, an information processing apparatus 1 includes a widely-used personal computer (hereinafter also referred to as a "PC") or similar type device. The PC 1 includes hardware described below with reference to FIG. 3. In the first embodiment, Windows® XP (or the like) available from Microsoft Corporation is installed in the PC 1 as an operating system (OS). A printer 3 is a color inkjet printer, which is a peripheral device according to this embodiment. Examples of peripheral devices according to an embodiment of the present invention include a printer, a copier, a facsimile, an image forming apparatus such as a multi-function apparatus including the combination thereof, a scanner, and a digital camera.

The printer 3 includes hardware described below with reference to FIG. 4. The printer 3 is connected to the PC 1 via a data communications I/F 9 (such as a USB interface), thereby allowing the printer 3 and the PC 1 to communicate bidirectionally. The term "USB" stands for a universal serial bus, which is a known interface allowing bidirectional communication.

A language monitor (hereinafter also referred to as an "LM") 36, which is described below with reference to FIG. 5, includes a dynamic link library for Windows®. A language monitor resource file (hereinafter also referred to as an "LM resource") 6, also includes a dynamic link library for Windows®. A bitmap resource and a character string resource, for example, are stored in the language monitor resource file 6. An application 30 includes an executable file (*.EXE) for Windows®. Examples of the application 30 include a status monitor that displays the status of the printer 3.

The application 30 can transmit data (information) to the LM 36 and can receive data (information) from the LM 36 using the Printing and Print Spooler Interfaces disclosed on the Internet at Microsoft's Microsoft developer network (MSDN) site (http://msdn.microsoft.com/library/default-.asp). The Printing and Print Spooler Interfaces is a known function of Windows® XP.

Figure 2:
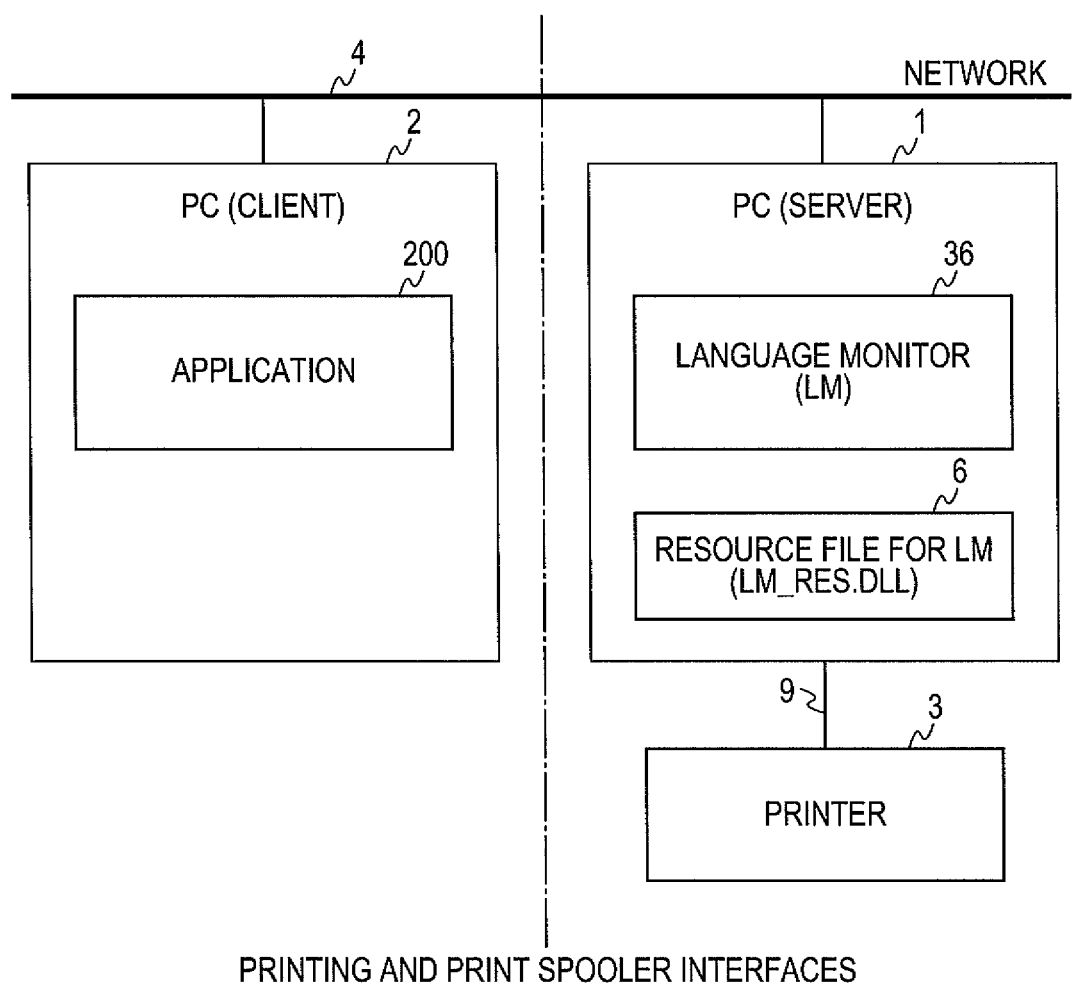
FIG. 2 illustrates a block diagram of an exemplary peripheral device control system including an information processing apparatus and a peripheral device according to an embodiment of the present invention when the system is adapted to be integrated into a network environment.

FIG. 2 illustrates a block diagram of an exemplary peripheral device control system including an information processing apparatus and a peripheral device according to an embodiment of the present invention when the system is adapted to be integrated into a network environment. As shown in FIG. 2, an information processing apparatus 2 may be a personal computer (PC) or the like. The PC 2 includes hardware described below with reference to FIG. 3. Windows® XP (or the like) is installed in the PC 2 as an operating system (OS). The PC 2 is connected to the PC 1 via a network 4 such as an Ethernet® network. As a result of the network 4, the PC 2 and the PC 1 can communicate bidirectionally. In the peripheral device control system according to this embodiment of the present invention, the PC 1 serves as a server and the PC 2 serves as a client. The PC 1 has a print server function which allows another information processing apparatus to carry out printing on the printer 3 serving as a shared printer via the network 4. An application 200 includes an executable file (*.EXE) for Windows® (or the like). Examples of the application 200 include a status monitor that displays the status of the printer 3.

The application 200 can transmit data (information) to the LM 36 and can receive data (information) from the LM 36 using the Printing and Print Spooler Interfaces. Since the Printing and Print Spooler Interfaces is a known function of Windows® XP, details of this function are not described here. Hereinafter, only some functions (information) are described in detail. Details of other functions are disclosed on the Internet at Microsoft's MSDN site.

Figure 3:
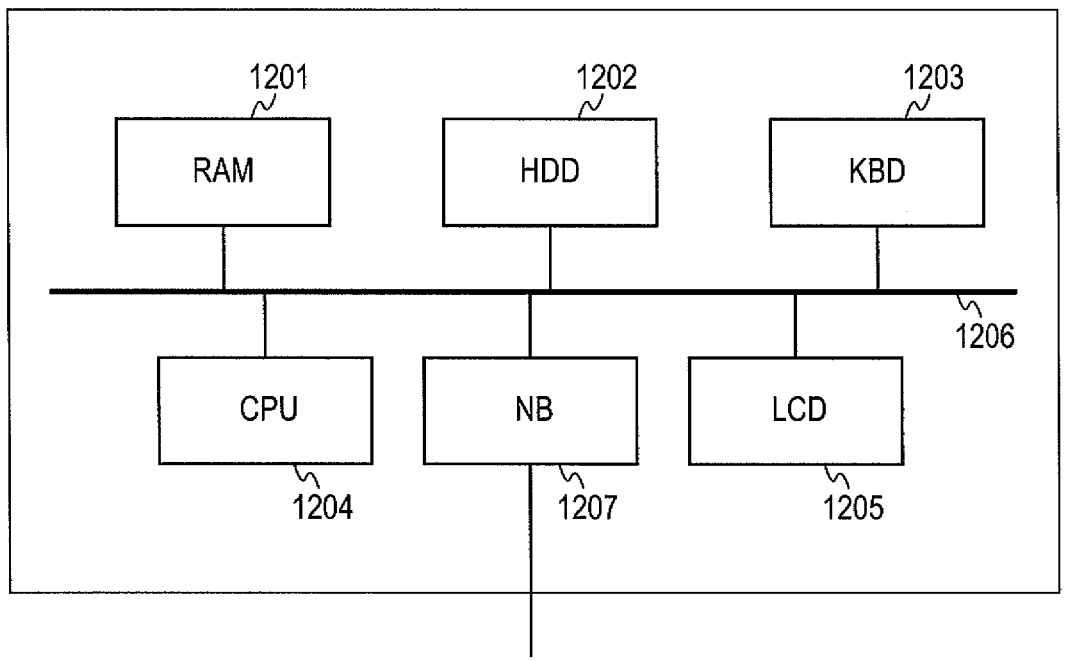
FIG. 3 is a block diagram of an exemplary hardware configuration of the PC.

FIG. 3 is a block diagram of an exemplary hardware configuration of a PC. Both PC 1 and PC 2 may have a similar hardware configuration as to that shown in FIG. 3. The exemplary hardware configuration of PC 1 will now be described. The PC 1 includes a random access memory (RAM) 1201; a hard disk drive (HDD) 1202, which is a storage unit; a keyboard (KBD) 1203, which is an example of an input unit; a central processing unit (CPU) 1204, which is a control unit; a liquid crystal display (LCD) 1205, which is an example of a display unit; a network board (NB) 1207, which is an example of a communications control unit; and a bus 1206 which connects these components of the PC 1 to each other. The storage unit may be, for example, a removable CD-ROM (Compact Disc-read only memory) or a built-in read only memory (ROM). Modules in the PC 1 (i.e., the application 30 and the LM 36) shown in FIG. 1 may be stored in the HDD 1202. These modules are loaded from the HDD 1202 into the RAM 1201 as needed and are executed by the CPU 1204. Thus, the CPU 1204 realizes the function of each module shown in FIG. 1.

Figure 4:
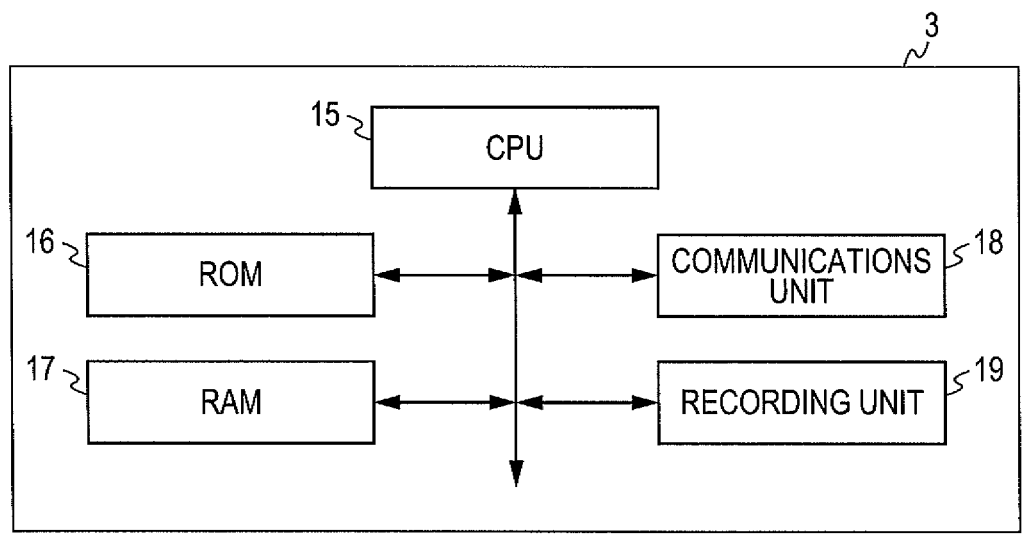
FIG. 4 illustrates an exemplary hardware configuration of a printer.

FIG. 4 illustrates an exemplary hardware configuration of a printer 3. A central processing unit 15 (CPU), which includes a microprocessor, functions as a central processing unit of the printer 3 which controls a RAM 17, a communications unit 18, and a recording unit 19 under the control of a program stored in a ROM 16.

A program for the printer 3 to carry out a recording (printing) operation and a notification operation of the status to the PC 1 under the control of a printer driver 50 is stored in the ROM 16. The printer driver 50 is described below with reference to FIG. 5.

The RAM 17 is mainly used to temporarily store print data, which is delivered from the PC 1 and is printed by the recording unit 19. The communications unit 18 includes a connection port for the USB interface 9 and controls USB communication. The recording unit 19 includes a recording portion composed of an inkjet recording head, ink tanks for individual colors, a carriage, and a recording paper transport mechanism, and an electric circuit composed of an application specific circuit (ASIC) for causing the recording head to generate a printing pulse on the basis of the print data.

In response to the print operation of the application capable of carrying out a printing operation, the display content (image data) of a file opened by the application is temporarily stored in the HDD 1202 as a spool file in EMF (Enhanced Metafile) format. The spool file is converted to print data including a control command for controlling the printer 3 by the printer driver 50. The print data is then delivered to the printer 3 via the USB interface 9. The print data received by the printer 3 is converted to printing pulses by the recording unit 19 and is printed on a recording paper sheet.

Figure 5:
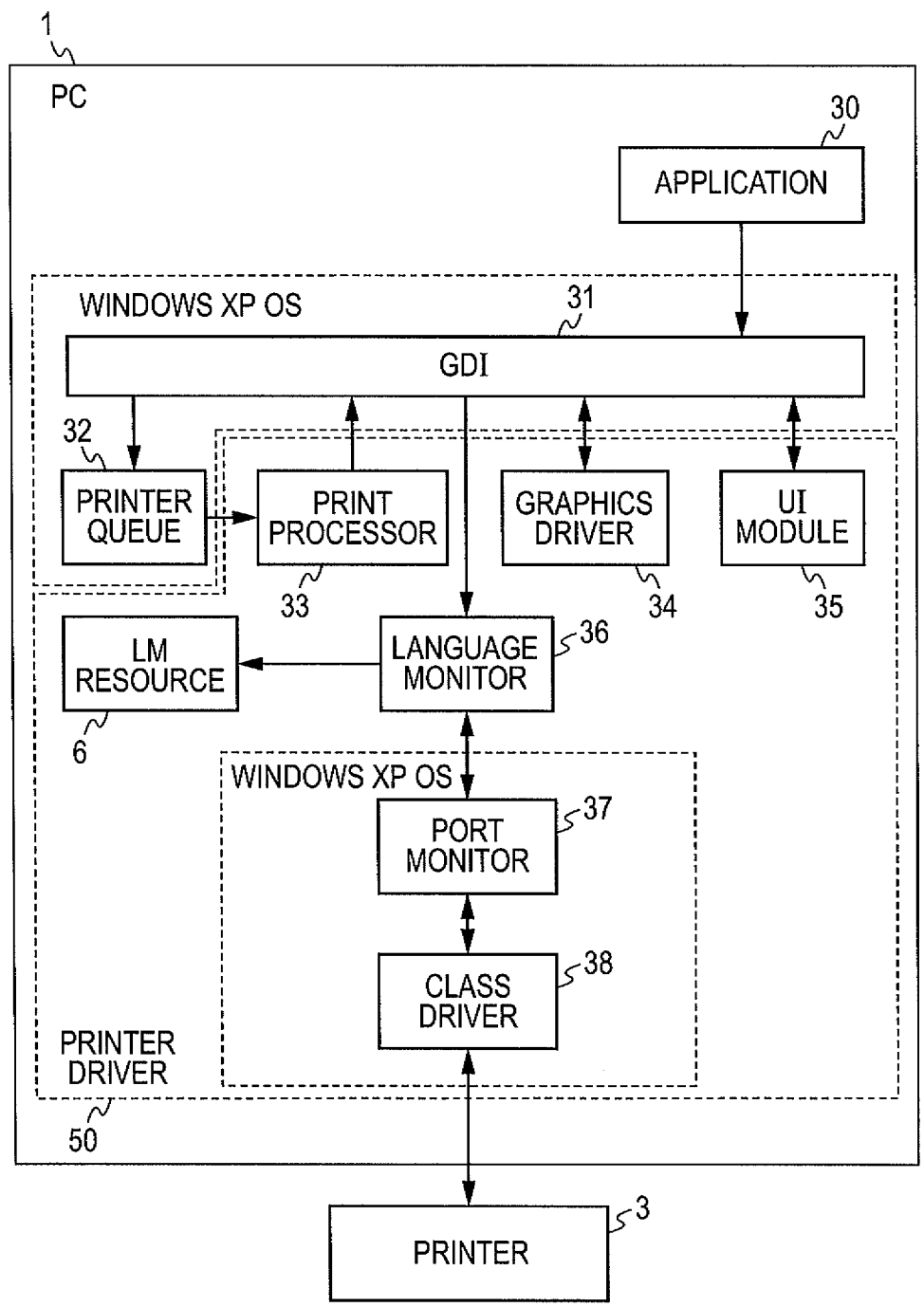
FIG. 5 illustrates a block diagram of an exemplary printer driver in the PC.

FIG. 5 illustrates a block diagram of an exemplary printer driver in the PC 1. As shown in FIG. 5, the printer driver 50 is installed in the PC 1. The printer driver 50 includes a plurality of modules 33 through 38. The application 30 is application software capable of submitting a print command and displaying the status of a printer. Examples of the application 30 include Notepad (Notepad.exe), which is a text editor bundled in Windows® XP OS. In this embodiment, the application 30 is a status monitor. A graphics device interface (GDI) 31 is a part of Windows® XP OS. A printer queue 32 is a part of a spooler of Windows® XP OS. The printer queue 32 queues a print job. The printer driver 50 is described next. A print processor 33 changes a print layout and carries out a specific process on a print image. A graphics driver 34 performs a central role of image processing of the printer driver 50. The graphics driver 34 processes a print image on the basis of a rendering command delivered from the GDI 31 to generate a print control command. A UI module 35 provides a user interface of the printer driver 50 and controls the user interface.

The LM 36 described in relation to FIG. 1 serves as a communication interface (I/F) of data and controls transmission and reception of the data. The language monitor resource file 6 described in relation to FIG. 1 is also a component of the printer driver 50. A port monitor 37 transmits data delivered from the LM 36 to an appropriate port or receives data delivered from the printer 3 via a class driver 38. The class driver 38 is a low-level module closest to a port. In this embodiment, the class driver 38 corresponds to a driver of a USB printer class and controls a port (a USB port in this embodiment). The printer driver 50 is a driver that supports multi language. Accordingly, the printer driver 50 supports all of the languages that multi-language based Windows® XP OS supports. The printer driver 50 holds character string resources for all of the languages.

FIG. 6 illustrates a diagram of exemplary schemas used by the application 30 (e.g., status monitor) to acquire ink information and ink condition from the printer 3. These schemas are specified as arguments when the application 30 calls an API function IBidiSpl::SendRecv( ) of a COM interface IBidiSpl used for Windows® XP OS in order to acquire ink information and ink condition from the printer 3 using the LM 36 via the Printing and Print Spooler Interfaces.

In FIG. 6, InkInfo is Property representing ink information. The full path specification of the schema is \Printer.InkInfo.[Color] is Property representing color information. The full path specification of the schema is \Printer.InkInfo.[Color]. A value specified for the schema is one of Black, which represents a black color; Cyan, which represents a cyan color; Magenta, which represents a magenta color; Yellow, which represents a yellow color; Photo, which represents integrated photo ink; and Color, which represents integrated color ink. For example, if the application 30 wants to acquire information about black ink, the application 30 specifies \Printer.InkInfo.Black.

Installed is a Value which represents whether ink of a color specified by [Color] is installed or not. The data type is Boolean. The full path specification of the schema is \Printer.InkInfo.[Color]:Installed. Available setting value is True, which indicates "installed", or False, which indicates "not installed".

State is a Value which represents the remaining ink level of a color specified by [Color]. The data type is String. The full path specification of the schema is \Printer.InkInfo.[Color]:State. Available setting value is Full, which indicates a full remaining ink level; Low, which indicates a low remaining ink level; Out, which indicates no remaining ink level; or Unknown, which indicates an unknown remaining ink level.

ModelName is a Value which represents the type of ink of a color specified by [Color]. The data type is String. The full path specification of the schema is \Printer.InkInfo.[Color]:ModelName. Available setting value is ASCII strings shown by Examples in FIG. 6.

Direction is a Value which represents the direction of arrangement of ink tank of a color specified by [Color]. The data type is String. The full path specification of the schema is \Printer.InkInfo.[Color]:Direction. Available setting value is LeftRight, which indicates a direction of the arrangement from left to right when a point of origin is located at the lower left of the printer, FrontBack, which indicates a direction of the arrangement from front to rear, or BottomTop, which indicates a direction of the arrangement from bottom to top.

Order is a Value which represents the order of ink tank of a color specified by [Color] from the point of origin. The point of origin is located at the lower left of the printer. The data type is Int. The full path specification of the schema is \Printer.InkInfo.[Color]:Order. For example, a value of 1 is set if the order of arrangement of ink of a color specified by [Color] is first from the point of origin. The value Installed, State, ModelName, Direction, or OrderValue is a value returned from the LM 36 or the printer 3 to the application 30.

Generally, the term "schema" refers to the whole structure of a database or a file describing the whole structure. As used herein, the term "schema" refers to a method or a format describing the condition of a peripheral device. By utilizing the aforementioned schemas, the application 30 can acquire the ink information, the ink condition, the direction of arrangement of the ink tank, and the order of the ink tank.

FIG. 7 illustrates a diagram of an exemplary schema and the values when the ink information and ink condition, the arrangement direction of the ink tank, and the order of the ink tank are enumerated using a schema shown in FIG. 6. As shown in FIG. 7, the application 30 (e.g., status monitor) calls the IBidiSpl::SendRecv( ) function by specifying a schema of \Printer.InkInfo. Thereafter, a set of a schema Query(Schema), a schema (Retrieve(Schema)) of the ink information and ink condition, the arrangement direction and the order of the ink tank, and their values (Retrieve (Value)) is returned.

In the example shown in FIG. 7, a black ink tank, a cyan ink tank, a magenta ink tank, and a yellow ink tank are installed in the printer 3. The amounts of remaining ink in these ink tanks are a full amount of ink (Full), a small amount of ink (Low), no amount of ink (Out), and a full amount of ink (Full), respectively. The types of the ink are CI-B, CI-C, CI-M, and CI-Y, respectively. The direction of arrangement of the ink tanks is from left to right. The order of the arrangement is black, cyan, magenta, and yellow from the left.

FIG. 8 illustrates an example of graphical representation of the remaining ink levels displayed by the application 30 (e.g., status monitor) using the schema shown in FIG. 7.

Character strings representing the current printer status are displayed in a field 40. In a field 41, the direction of arrangement of the ink tanks, the order of the ink tanks, and the remaining ink levels are graphically represented. The ink tanks are arranged in the order of black (42), cyan (43), magenta (44), and yellow (45) from the left. The remaining ink levels are a full amount of ink (Full) for black, a small amount of ink (Low) for cyan, no amount of ink (Out) for magenta, and a full amount of ink (Full) for yellow. Although not shown, the type of ink (CI-B, CI-C, CI-M, or CI-Y) or the color name (black, cyan, magenta, or yellow) may be displayed together with the remaining ink levels of black (42), cyan (43), magenta (44), and yellow (45).

FIG. 9 illustrates a diagram of an exemplary schema and the values when the ink information and ink condition, the arrangement direction of the ink tank, and the order of the ink tank are enumerated in a printer in which ink tanks are arranged in the front to rear direction. In an example shown in FIG. 9, a black ink tank (Black) and an integrated color ink tank (Color) are installed in the printer 3. The remaining ink levels are a full amount of ink (Full) for the black ink tank and a small amount of ink (Low) for the color ink tank. The types of ink are CI-B and CI-Color, respectively. The direction of arrangement of the ink tanks is from the front to rear of the printer. The order of the arrangement is color ink and black ink from the front.

FIG. 10 illustrates an example of graphical representation of the remaining ink levels displayed by the application 30 (e.g., status monitor) using the schema shown in FIG. 9. Character strings representing the current printer status are displayed in a field 104. In a field 103, the direction of arrangement of the ink tanks, the order of the ink tanks, and the remaining ink levels are graphically represented. The ink tanks are arranged in the order of color ink (101) and black ink (102) from the front. The remaining ink levels are a small amount of ink (Low) for the color ink and a full amount of ink (Full) for the black ink.

FIG. 11 illustrates a diagram of an exemplary schema and the values when the ink information and ink condition, the arrangement direction of the ink tank, and the order of the ink tank are enumerated in a printer in which ink tanks are arranged in a vertical direction. In the example shown in FIG. 11, an integrated color ink tank (Color) and an integrated photo ink tank (Photo) are installed in the printer 3. The remaining ink levels are a full amount of ink (Full) for the color ink tank and a small amount of ink (Low) for the photo ink tank. The types of ink are CI-Color and CI-Photo, respectively. The direction of arrangement of the ink tanks is from the bottom to top of the printer. The order of the arrangement is color ink and photo ink from the bottom.

Figure 12:
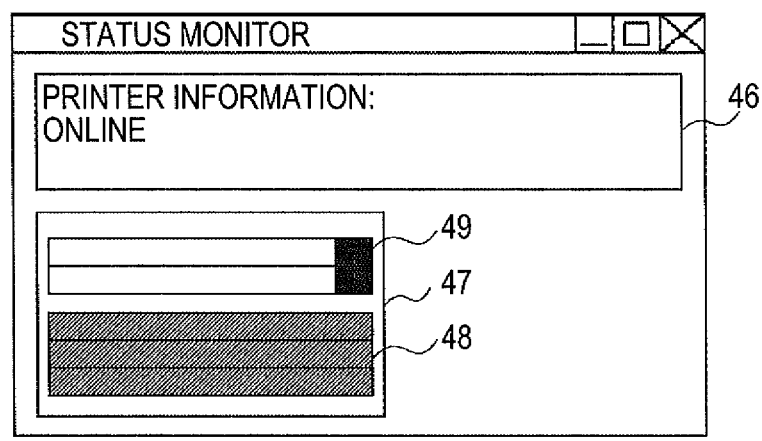
FIG. 12 illustrates an example of graphical representation of remaining ink levels displayed by the application using the schema shown in FIG. 11.

FIG. 12 illustrates an example of graphical representation of the remaining ink levels displayed by the application 30 (e.g., status monitor) using the schema shown in FIG. 11. Character strings representing the current printer status are displayed in a field 46. In a field 47, the direction of arrangement of the ink tanks, the order of the ink tanks, and the remaining ink levels are graphically represented. The ink tanks are arranged in the order of color ink (48) and photo ink (49) from the bottom. The remaining ink levels are a full amount of ink (Full) for the color ink tank and a small amount of ink (Low) for the photo ink tank.

FIG. 13 illustrates a diagram of data for the PC 1 to acquire ink information from the printer 3. In practice, binary data is communicated between the PC 1 and the printer 3. However, for the sake of simplicity, text data encoded with ASCII character code is shown in FIG. 13. When the PC 1 submits a request command to the printer 3 via the USB interface 9, ink information is returned from the printer 3 to the PC 1 via the USB interface 9. The ink information includes the following items (see Table I).

TABLE I

| Color | Type | State |
| --- | --- | --- |
| Black | CI-B | Full |
| cyan | CI-C | Small amount |
| magenta | CI-M | No amount |
| yellow | CI-Y | Full |

Like FIG. 13, FIG. 14 illustrates data for the PC 1 to acquire ink information from the printer 3. However, unlike FIG. 13, in FIG. 14, the PC 1 acquires the direction of arrangement of ink tanks and the order of arrangement of the ink tanks from the printer 3. The direction and order of arrangement, as correlated to color, is shown below in Table II.

TABLE II

| Color | Type | State | Direction of arrangement | Order of arrangement |
| --- | --- | --- | --- | --- |
| Black | CI-B | Full | Left to right | 1 |
| cyan | CI-C | Small amount | Left to right | 2 |
| magenta | CI-M | No amount | Left to right | 3 |
| yellow | CI-Y | Full | Left to right | 4 |

As described above, there are two types of printers: one can return information such as the direction of arrangement of ink tanks and the order of arrangement (see FIG. 14) and the other cannot (see FIG. 13).

Exemplary operation of the present embodiment is described below with reference to FIGS. 15 through 19.

[Exemplary Processes for Updating Display of Ink Information]

Figure 15:
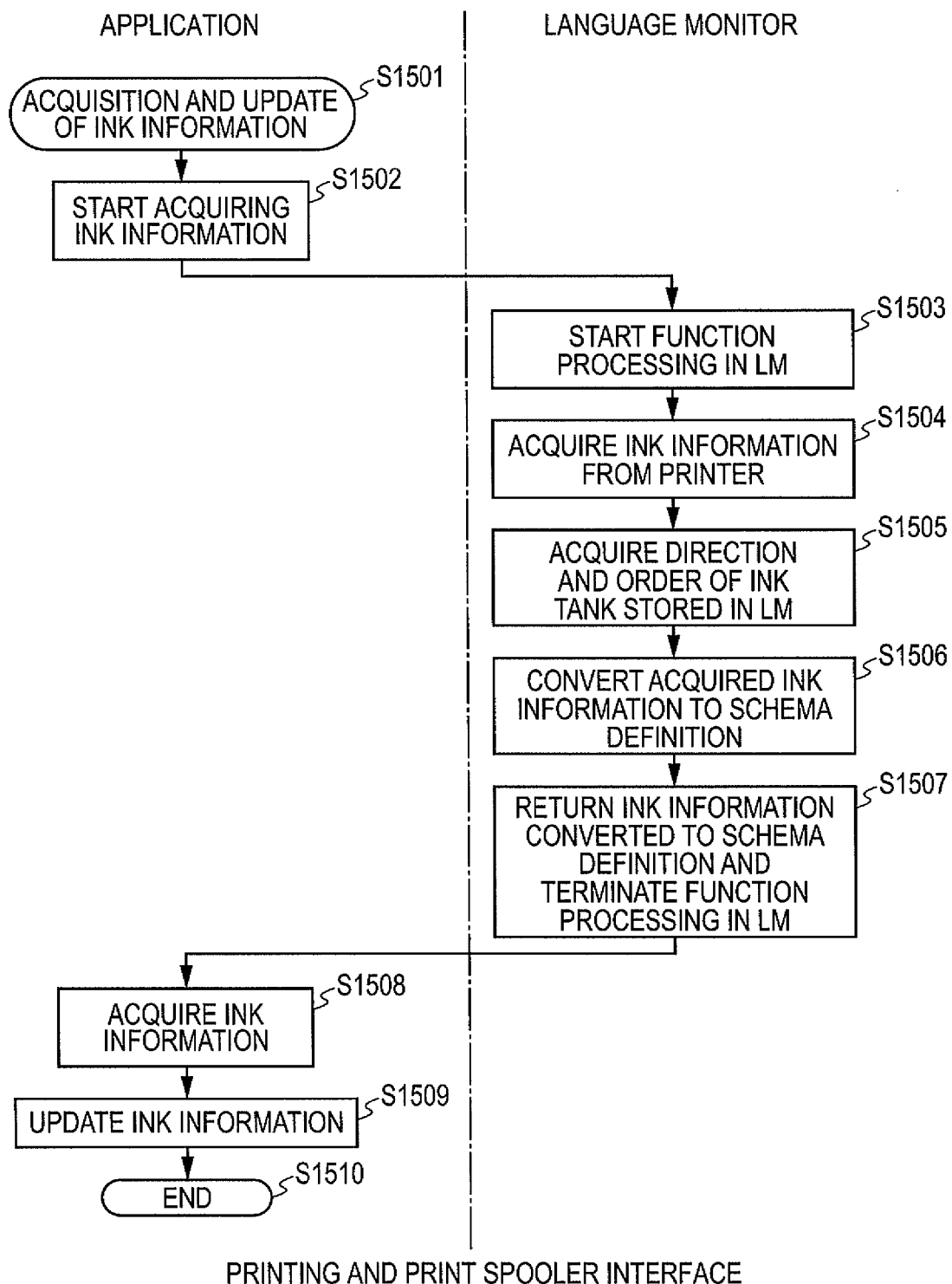
FIG. 15 is a flow chart of an exemplary process for the application to update the display of ink information after the application acquires the ink information from a printer.

FIG. 15 is a flow chart of an exemplary process for updating the display of ink information after the application 30 (e.g., status monitor) acquires the ink information from the printer 3. Here, the printer 3 cannot return information about the direction of arrangement of ink tanks and the order of the arrangement. As shown in FIG. 15, the application 30 starts a process for receiving ink information from the printer 3 and updating the display of the ink information (step S1501). The application 30 calls the API function IBidiSpl::SendRecv( ) of the COM interface IBidiSpl by specifying a schema of \Printer.InkInfo shown in FIG. 6 as an argument so as to start acquiring the ink information (step S1502).

Thereafter, the SendRecvBidiDataFromPort( ) function, which the LM 36 exports, is called by the spooler of the Windows® XP OS via the Printing and Print Spooler Interfaces, and the process of the function starts (step S1503). The detailed description and the drawings of the spooler are not shown here, since the spooler is one of known functions of Windows® XP. Next, a request command shown in FIG. 13 is submitted from the PC 1 using the SendRecvBidiDataFromPort( ) function of the LM 36, and ink information returned from the printer 3 is acquired (step S1504).

Furthermore, the LM 36 acquires the direction of arrangement of ink tanks and the order of arrangement of the ink tanks stored in the application 30 itself (step S1505). The LM 36 then converts the acquired information to a schema definition in accordance with the schema definition of \Printer.InkInfo specified as the argument of the SendRecvBidi- DataFromPort( ) function (step S1506). Next, the LM 36 returns the ink information converted to the schema definition as an argument of the SendRecvBidiDataFromPort( ) function, and the process of the SendRecvBidiDataFromPort( ) function of the LM 36 is completed (step S1507).

The IBidiSpl::SendRecv( ) function is returned to the application 30, and therefore, the application 30 acquires the schema definition of the ink information returned as the argument of the function (step S1508). The application 30 updates ink information using this acquired ink information (step S1509). The process is then completed (step S1510).

In general, the application 30 repeats the process starting from step S1501, which updates the display of ink information after the application 30 (e.g., status monitor) acquires the ink information from the printer 3, at predetermined intervals, for example, once per five seconds. Thus, the application 30 can display the ink information and ink condition of the ink tank installed in the printer 3 in real time.

Figure 16:
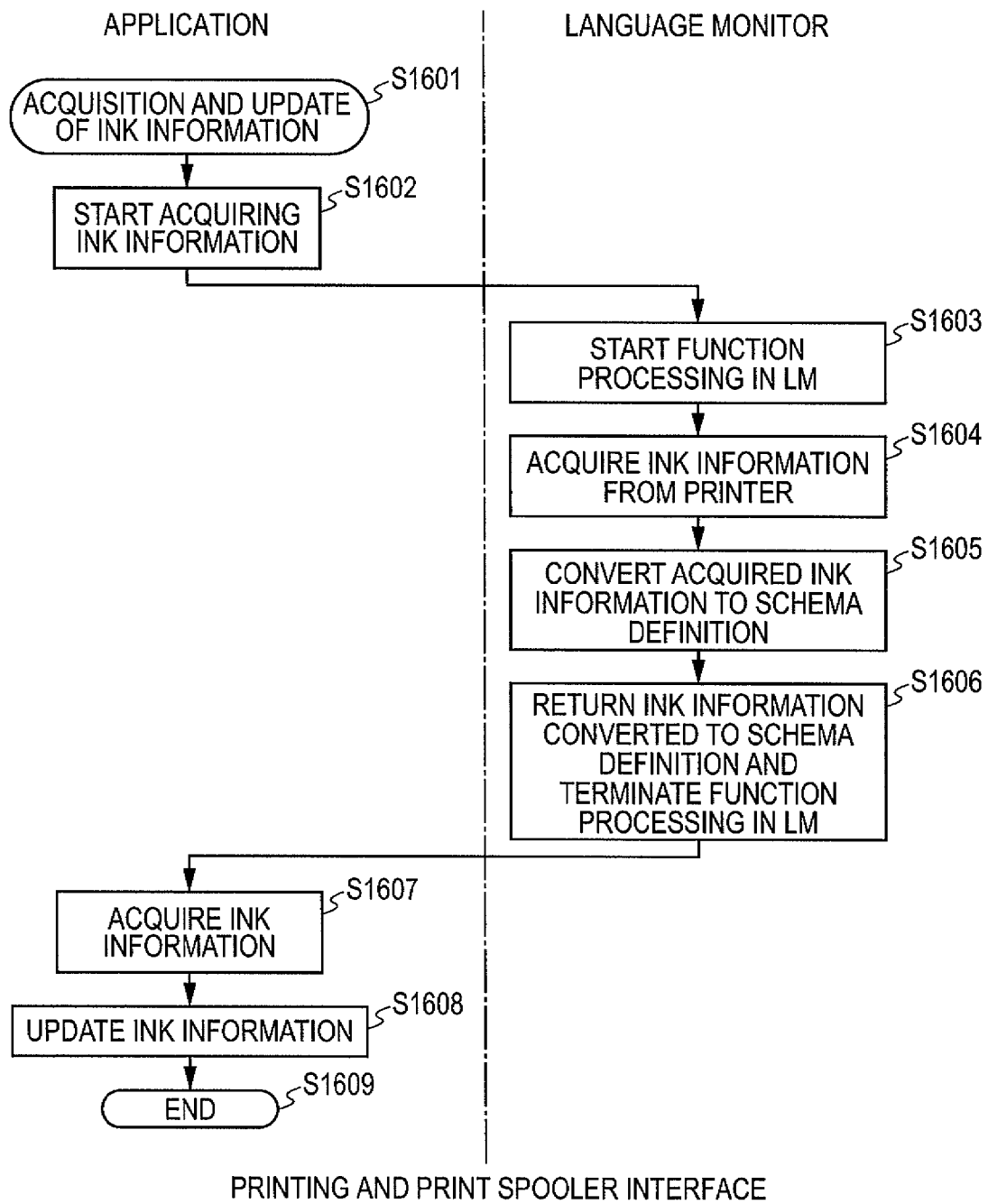
FIG. 16 is a flow chart of an exemplary process for the application to update the display of ink information after the application acquires the ink information from a printer.

Like FIG. 15, FIG. 16 is a flow chart of an exemplary process for updating the display of ink information after the application 30 (e.g., status monitor) acquires the ink information from the printer 3. Here, the printer 3 can return information about the direction of arrangement of ink tanks and the order of the arrangement.

As shown in FIG. 16, the application 30 starts a process for acquiring ink information from the printer 3 and updating the display of the ink information (step S1601). The application 30 calls the API function IBidiSpl::SendRecv( ) of the COM interface IBidiSpl by specifying a schema of \Printer.InkInfo shown in FIG. 6 as an argument so as to start acquiring the ink information (step S1602). Thereafter, the SendRecvBidiDataFromPort( ) function, which the LM 36 exports, is called by the spooler via the Printing and Print Spooler Interfaces and the process of the function starts (step S1603).

A request command shown in FIG. 14 is submitted from the PC 1 using the SendRecvBidiDataFromPort( ) function of the LM 36, and ink information such as the remaining ink level, the direction of arrangement of ink tanks, and the order of the arrangement is acquired from the printer 3 (step S1604). The LM 36 then converts the acquired information to a schema definition in accordance with the schema definition of \Printer.InkInfo specified as the argument of the SendRecvBidiDataFromPort( ) function (step S1605). Next, LM 36 returns the ink information converted to the schema definition as an argument of the SendRecvBidiDataFromPort( ) function, and the process of the SendRecvBidiDataFromPort( ) function is completed (step S1606).

The IBidiSpl::SendRecv( ) function is returned to the application 30, and therefore, the application 30 acquires the schema definition of the ink information returned as the argument of the function (step S1607). The application 30 updates ink information using this returned ink information (step S1608). The process for updating the display of ink information after the application 30 acquires the ink information from the printer 3 is then completed (step S1609).

Figure 17:
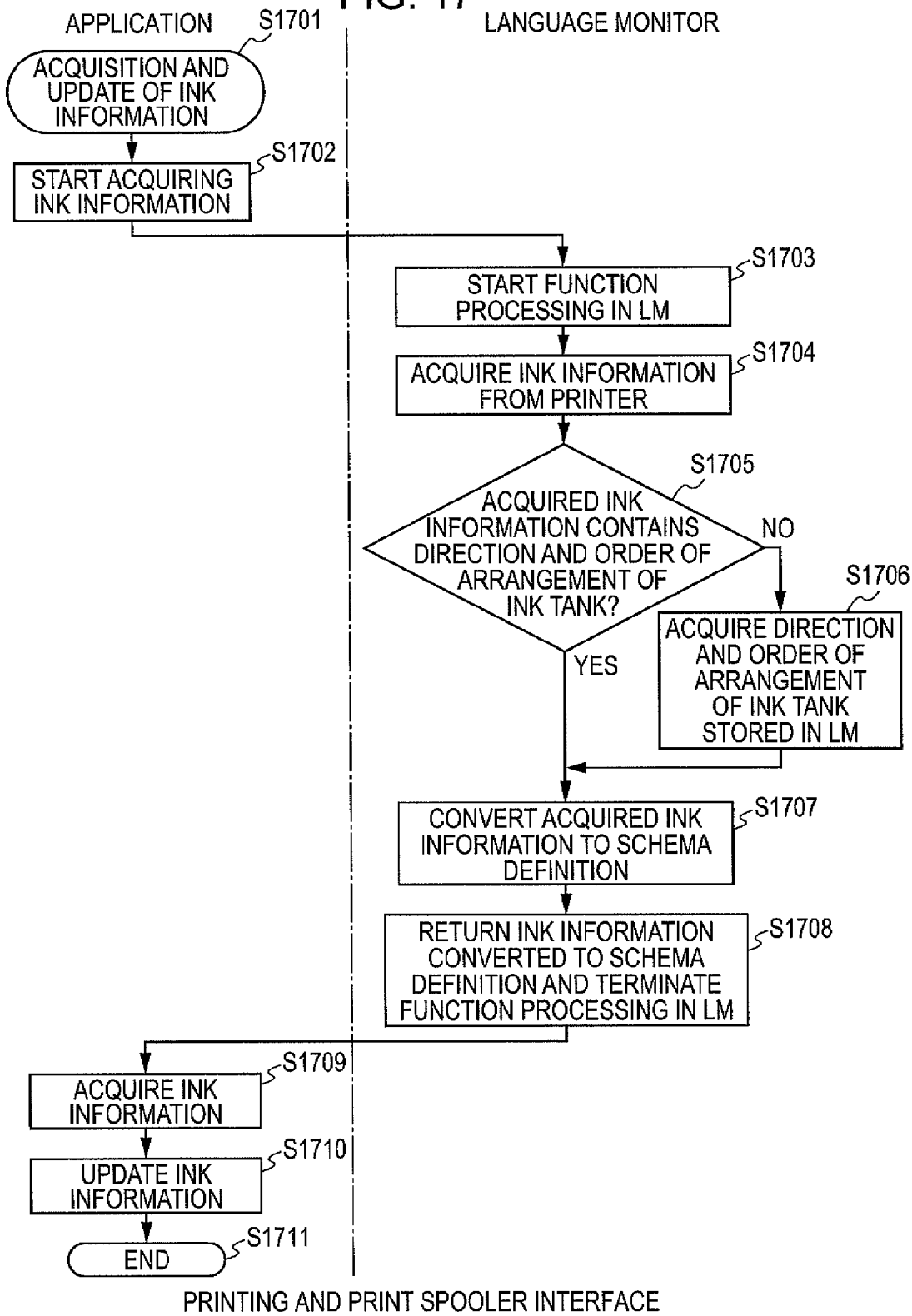
FIG. 17 is a flow chart of an exemplary process for the application to update the display of ink information after the application acquires the ink information from a printer.

Like FIGS. 15 and 16, FIG. 17 is a flow chart of an exemplary process for updating the display of ink information after the application 30 (e.g., status monitor) acquires the ink information from the printer 3. Here, the LM 36 determines whether ink information acquired from the printer 3 (see step S1704) contains information about the direction of arrangement of ink tanks and the order of the arrangement (step S1705). If the ink information does not contain the direction of arrangement of ink tanks and the order of the arrangement, the LM 36 acquires the direction of arrangement of ink tanks and the order of the arrangement from the internal database of the LM 36 (step S1706).

More specifically, as shown in FIG. 17, the application 30 starts a process for receiving ink information from the printer 3 and updating the display of the ink information (step S1701). The application 30 calls the API function IBidiSpl::SendRecv( ) of the COM interface IBidiSpl by specifying a schema of \Printer.InkInfo shown in FIG. 6 as an argument so as to start acquiring the ink information (step S1702). Thereafter, the SendRecvBidiDataFromPort( ) function, which the LM 36 exports, is called by the spooler via Printing and Print Spooler Interfaces and the process of the function starts (step S1703).

A request command shown in FIG. 13 or 14 is submitted from the PC 1 using the SendRecvBidiDataFromPort( ) function of the LM 36, and ink information returned from the printer 3 is acquired (step S1704). Subsequently, the LM 36 determines whether the returned ink information contains information about the direction of arrangement of ink tanks and the order of the arrangement (step S1705).

If the information acquired from the printer 3 does not contain information about the direction of arrangement of ink tanks and the order of the arrangement, as shown in FIG. 13, the LM 36 acquires the direction of arrangement of ink tanks and the order of the arrangement stored in the LM 36 itself (step S1706). In contrast, if the information acquired from the printer 3 contains information about the direction of arrangement of ink tanks and the order of the arrangement, the process proceeds to step S1707.

At step S1707, the LM 36 converts the ink information acquired at step S1704 or S1706 to a schema definition in accordance with the schema definition of \Printer.InkInfo specified as the argument of the SendRecvBidiDataFromPort( ) function. The LM 36 then returns the ink information converted to the schema definition as an argument of the SendRecvBidiDataFromPort( ) function, and the process of the SendRecvBidiDataFromPort( ) function is completed (step S1708).

The IBidiSpl::SendRecv( ) function is returned to the application 30, and therefore, the application 30 acquires the schema definition of the ink information returned as the argument of the function (step S1709). The application 30 updates ink information using this returned ink information (step S1710). The process for updating the display of ink information after the application 30 acquires the ink information from the printer 3 is then completed (step S1711).

[Exemplary Methods for Printer to Acquire Direction and Order Arrangement]

Figure 18:
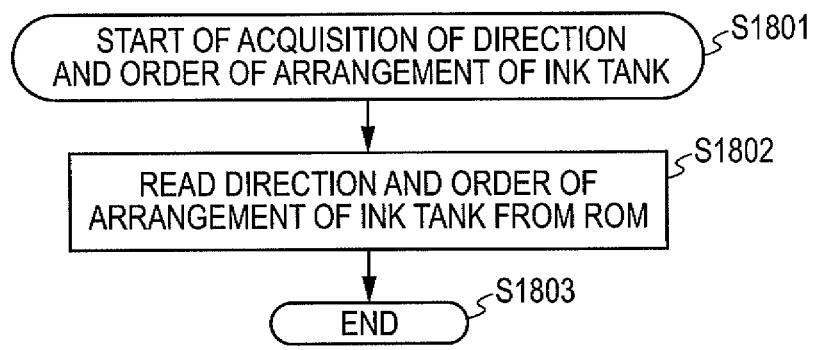
FIG. 18 is a flow chart illustrating an exemplary method for the printer to acquire the direction of arrangement of ink tanks and the order of the arrangement.
Figure 19:
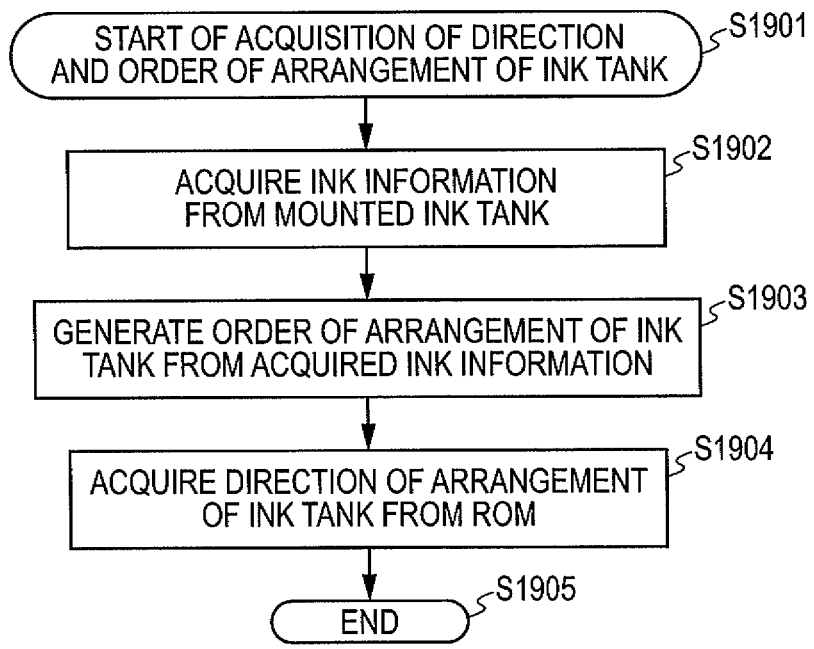
FIG. 19 is a flow chart illustrating another exemplary method for the printer to acquire the direction of arrangement of ink tanks and the order of the arrangement.

FIGS. 18 and 19 are flow charts illustrating two exemplary methods for the printer 3 to acquire the direction of arrangement of ink tanks and the order of the arrangement. Programs associated with the process flow shown in FIGS. 18 and 19 are stored in the ROM 16. The CPU 15 appropriately reads out the programs to execute them.

A first exemplary method is described next with reference to FIG. 18. The first method is applicable to a printer in which the installed position of an ink tank is fixed. The printer 3 receives a request command for requesting ink information shown in FIG. 14 from the PC 1 via the USB interface 9 (step S1801). The printer 3 reads out information about the direction of arrangement of ink tanks and the order of the arrangement (step S1802). The printer 3 then converts the information to the command format shown in FIG. 14 and returns the ink information to the PC 1. The process is then completed (step S1803).

A second exemplary method is described next with reference to FIG. 19. The second method is applicable to a printer in which an ink tank can be installed at any location. The printer 3 receives a request command for requesting ink information shown in FIG. 14 from the PC 1 via the USB interface 9 (step S1901). The printer 3 reads out identification information (color information) from a memory of an ink cartridge or an ink tank to check the direction of arrangement of ink tanks and the order of the arrangement (step S1902). The printer 3 then generates information about the order of the arrangement (step S1903). The printer 3 reads out information about the direction of arrangement of ink tanks from the ROM 16 (step S1904). Subsequently, the printer 3 converts the information to the command format shown in FIG. 14 and returns the ink information to the PC 1. The process is then completed (step S1905).

Second Exemplary Embodiment

An exemplary peripheral device control system according to a second embodiment of the present invention is described below with reference to the peripheral device control system of the first embodiment described in relation to FIGS. 1 and 2.

FIGS. 20 and 21 illustrate diagrams of exemplary schemas used by an application 30 to acquire ink information and ink condition from a printer 3. These schemas are specified as arguments when the application 30 calls the API function IBidiSpl::SendRecv( ) of the COM interface IBidiSpl used for Windows® XP OS in order to acquire the ink information and ink condition from the printer 3 using the LM 36 via the Printing and Print Spooler Interfaces.

In FIG. 20, InkInfo is Property representing ink information. The full path specification of the schema is \Printer.InkInfo.[Color] is Property representing color information. The full path specification of the schema is \Printer.InkInfo.[Color]. A value specified for the schema is one of Black, which represents a black color; Cyan, which represents a cyan color; Magenta, which represents a magenta color; Yellow, which represents a yellow color; Color, which represents integrated color ink; and Photo, which represents integrated photo ink. For example, if the application 30 wants to acquire information about black ink, the application 30 specifies \Printer.InkInfo.Black.

Installed is a Value which represents whether ink of a color specified by [Color] is installed or not. The data type is Boolean. The full path specification of the schema is \Printer.InkInfo.[Color]:Installed. Available setting value is True, which indicates "installed", or False, which indicates "not installed".

Level is a Value which represents a remaining ink level of a color specified by [Color]. The data type is Int. The full path specification of the schema is \Printer.InkInfo.[Color]:Level. Available setting value is a value between 0(%), which indicates no amount of remaining ink, and 100(%), which indicates a full amount of remaining ink, or a value of −1 which indicates an unknown amount of remaining ink.

ModelName is a Value which represents the type of ink of a color specified by [Color]. The data type is String. The full path specification of the schema is \Printer.InkInfo.[Color]:ModelName. Available setting value is ASCII strings shown by Examples in FIG. 20.

Direction is a Value which represents the direction of arrangement of ink tank of a color specified by [Color]. The data type is String. The full path specification of the schema is \Printer.InkInfo.[Color]:Direction. Available setting value is LeftRight, which indicates a direction of the arrangement from left to right when a point of origin is located at the lower left of the printer, FrontBack, which indicates a direction of the arrangement from front to rear, or Bottom-Top, which indicates a direction of the arrangement from bottom to top.

Order is a Value which represents the order of arrangement of ink tank of a color specified by [Color] from the point of origin. The point of origin is located at the lower left of the printer. The data type is Int. The full path specification of the schema is \Printer.InkInfo.[Color]:Order. For example, a value of 1 is set if the order of ink of a color specified by [Color] is first from the point of origin.

In FIG. 21, Image is Value representing an ink image of a color specified by [Color]. The data type is Bitmap. The full path specification of the schema is \Printer.InkInfo.[Color]:Image. Available setting value is a bitmap file (binary data). The bitmap file (binary data) representing an ink image is an ink image when the amount of remaining ink is full.

In FIGS. 20 and 21, the values Installed, State, Model-Name, Direction, Order, and Image are values returned from the LM 36 or the printer 3 to the application 30. Thus, the application 30 can acquire the ink information and ink condition, and more specifically, a remaining ink level, the arrangement direction of the ink tank, and the order of arrangement of the ink tank, and an ink image.

FIG. 22 illustrates a diagram of an exemplary schema and the values when ink information and ink condition are enumerated using the schemas shown in FIGS. 20 and 21. As shown in FIG. 22, the application 30 (e.g., status monitor) calls the IBidiSpl::SendRecv( ) function by specifying a schema of \Printer.InkInfo. Thereafter, a set of a schema Query(Schema), a schema (Retrieve(Schema)) of the ink information and ink condition, the direction of arrangement, and the order of arrangement of ink tanks in the printer 3, and their values (Retrieve(Value)) is returned.

In the example shown in FIG. 22, a black ink tank, a yellow ink tank, a magenta ink tank, and a cyan ink tank are installed in the printer 3. The remaining ink levels in these ink tanks are 80%, 50%, 0% (no remaining ink), and a 100% (full remaining ink), respectively. The types of the ink are CI-B, CI-Y, CI-M, and CI-C, respectively. The direction of arrangement of the ink tanks is from left to right. The order of the arrangement is black, yellow, magenta, and cyan from the left. The ink images are bitmap files of CI-B.bmp, CI-Y.bmp, CI-M.bmp, and CI-C.bmp, respectively.

Thus, by enumerating the ink information and ink condition, the application 30 can acquire the ink information and ink condition, and more specifically, the remaining ink levels, the arrangement direction of the ink tanks, and the order of arrangement of the ink tanks, and ink images.

It should be noted that the order of arrangement of the ink tanks is different from that of the first embodiment shown in FIG. 7. The printer 3 can include a plurality of types of ink heads. In this example, an ink head having a type different from that shown in FIG. 7 is installed in the printer 3.

Figure 23:
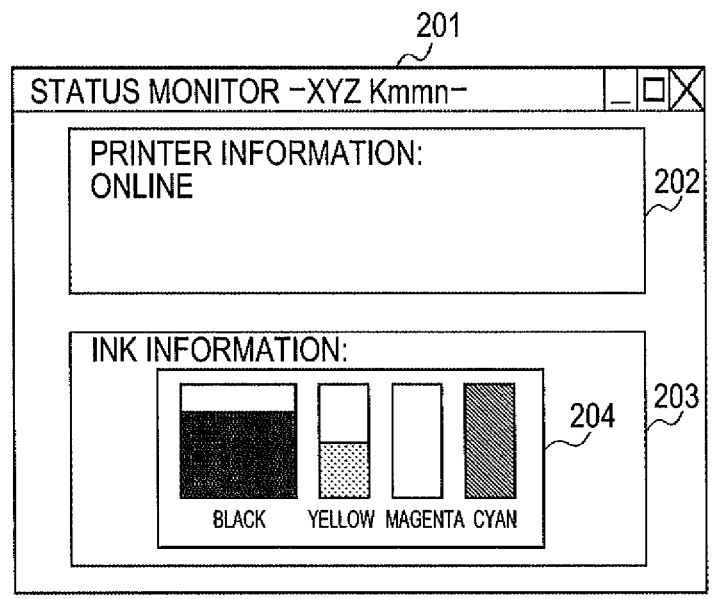
FIG. 23 is an exemplary display screen of a status monitor for monitoring the status of a printer.

FIG. 23 is an exemplary display screen of a status monitor for monitoring the status of a printer. Here, the status monitor in the drawing is the application 30 installed in the PC 1. As shown in FIG. 23, a main window 201 of the status monitor displays the current status of the printer 3 (i.e., a printer having a model name kmmn manufactured by XYZ Corporation). A printer information display field 202 indicates that the printer is online. An ink information display field 203 displays information about ink in the printer 3. A remaining ink level display field 204 displays amounts of remaining ink installed in the printer 3.

This embodiment of the present invention is characterized in that any application can display the condition of ink installed in the printer 3 (e.g., the shape of a ink tank, a color of ink, the size of an ink tank, a direction of arrangement of ink tanks, the order of the arrangement, and a remaining ink level) in a visually realistic manner by using accurate graphics, thus increasing the user operability. As can be seen from FIG. 23, the printer 3 includes a large-sized black tank (represented by "Black"), a standard-sized yellow tank (represented by "Yellow"), a standard-sized magenta tank (represented by "Magenta"), and a standard-sized cyan tank (represented by "Cyan") arranged from left to right in this order. Furthermore, the respective remaining ink levels 80%, 50%, 0% (no ink), and 100% (full ink) are displayed in a visually realistic manner using graphics.

Figure 24:
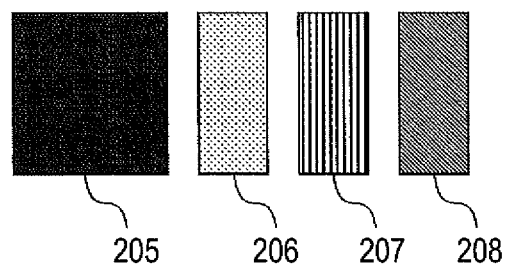
FIG. 24 is a diagram illustrating exemplary display content of a bitmap file of an ink image for each color shown in FIG. 22.

FIG. 24 is a diagram illustrating exemplary display content of a bitmap file of an ink image for each color. In FIG. 24, a display content 205 of the bitmap file (CI-B.bmp) of a black ink image is shown when the amount of remaining ink is full. Also shown are a display content 206 of the bitmap file (CI-Y.bmp) of a yellow ink image, a display content 207 of the bitmap file (CI-M.bmp) of a magenta ink image, and a display content 208 of the bitmap file (CI-C.bmp) of a cyan ink image when the amounts of remaining ink are full.

Figure 25:
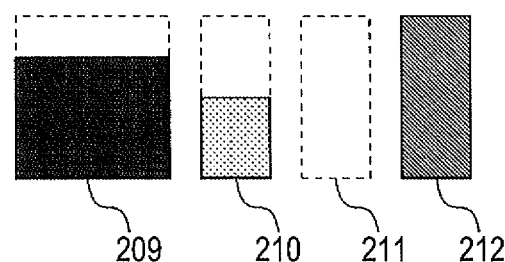
FIG. 25 is a diagram illustrating exemplary display content of a bitmap file of a remaining ink image for each color.

FIG. 25 is a diagram illustrating an exemplary display content of a bitmap file of a remaining ink image for each color. In FIG. 25, a display content 209 of a bitmap file of a black ink image is shown when the remaining ink level is 80%. Also shown are a display content 210 of a bitmap file of a yellow ink image when the remaining ink level is 50%, a display content 211 of a bitmap file of a magenta ink image when the remaining ink level is 0%, and a display content 212 of a bitmap file of a cyan ink image when the remaining ink level is 100%. The dotted lines in the drawing are representative of the full levels of ink, however, the dotted lines are not displayed in practice.

FIG. 26 illustrates a diagram of an exemplary schema and the values when ink information and ink condition are enumerated using the schemas shown in FIGS. 20 and 21. As shown in FIG. 26, the application 30 (e.g., status monitor) calls the IBidiSpl::SendRecv( ) function by specifying a schema of \Printer.InkInfo. Thereafter, a set of a schema Query(Schema), a schema (Retrieve(Schema)) of the information and conditions of ink, the direction of arrangement of an ink tank, the order of arrangement of the ink tank, and an ink image, and their values (Retrieve(Value)) in the printer 3 is returned.

In the example shown in FIG. 26, a color ink tank in which yellow ink, magenta ink, and cyan ink are integrated and a photo ink tank in which special ink of three colors for photo printing are integrated are installed in the printer 3. The remaining ink levels in these ink tanks are 40% and 80%, respectively. The types of the ink are CI-Color and CI-Photo, respectively. The direction of arrangement of the ink tanks is from bottom to top. The order of the arrangement is Color and Photo from the bottom. The bitmap files of the ink images are CI-Color.bmp and CI-Photo.bmp, respectively.

Thus, by enumerating the ink information and ink condition, the application 30 can acquire the ink information and ink condition, and more specifically, the remaining ink level, the direction of arrangement of the ink tanks, and the order of arrangement of the ink tanks, and the ink images.

It should be noted that the type of ink, the direction of arrangement, and the order of arrangement of the ink tanks are different from those of the first embodiment shown in FIG. 7 or those of the second embodiment shown in FIG. 22. The printer 3 can include a plurality of types of ink heads.

In this example, an ink head having a type different from that shown in FIG. 7 is installed in the printer 3.

Figure 27:
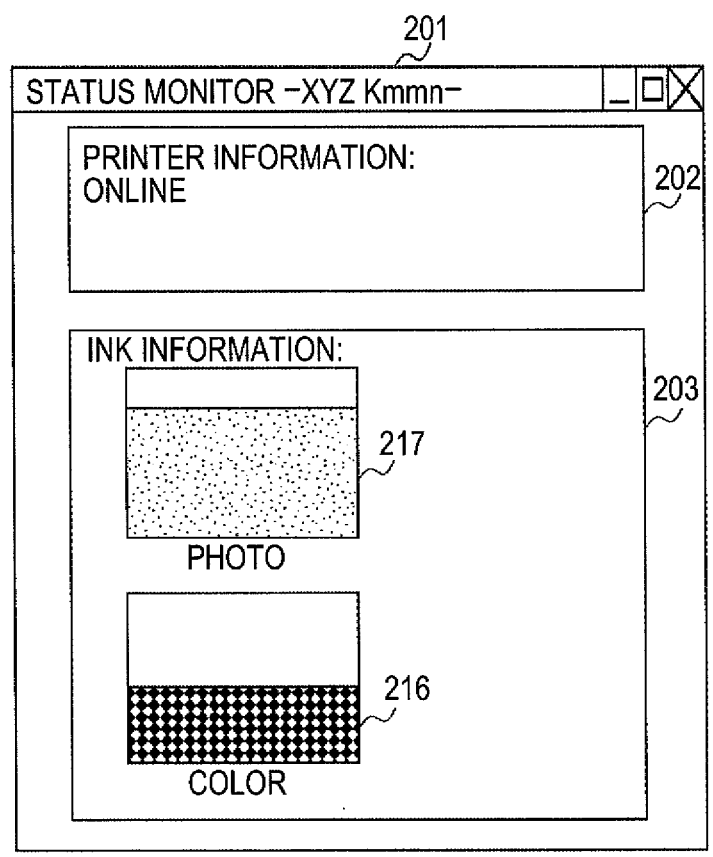
FIG. 27 is an exemplary display screen of a status monitor for monitoring the status of a printer.

FIG. 27 is an exemplary display screen of a status monitor for monitoring the status of a printer. Here, the status monitor in the drawing is the application 30 installed in the PC 1. As shown in FIG. 27, windows 201, 202, and 203 of the status monitor are identical to those described in relation to FIG. 23.

A remaining ink level display field 216 displays an amount of remaining color ink installed in the printer 3. A remaining ink level display field 217 displays an amount of remaining photo ink installed in the printer 3. Additionally, in this embodiment of the present invention, any application can display the condition of ink installed in the printer 3 (e.g., the shape of a ink tank, a color of ink, the size of an ink tank, a direction of arrangement of ink tanks, the order of the arrangement, and a remaining ink level) in a visually realistic manner by using accurate graphics, thus increasing the user operability.

As can be seen from FIG. 27, the printer 3 includes two types of integrated ink tanks, namely, a color ink tank in which yellow ink, magenta ink, and cyan ink are integrated and a photo ink tank in which special ink of three colors for photo printing are integrated. These ink tanks are installed in the printer 3 while being arranged from bottom to top in this order. Furthermore, the respective remaining ink levels 40% and 80% are displayed in a visually realistic manner using graphics.

Figure 28:
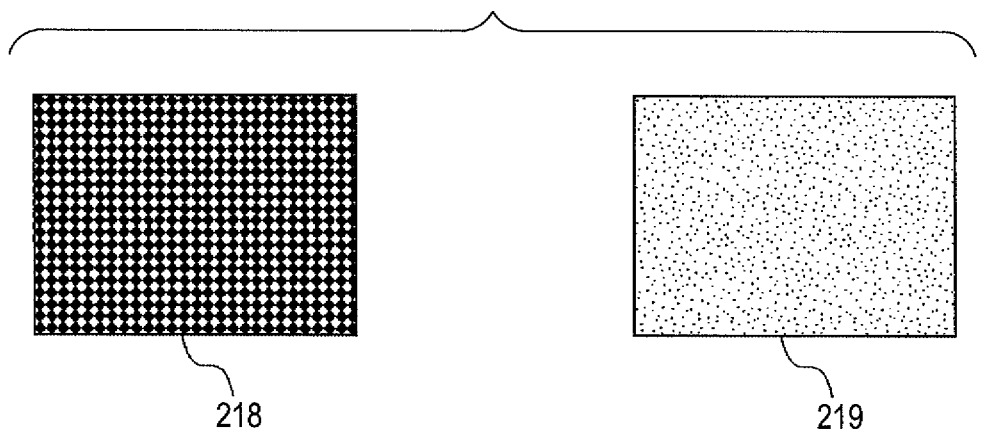
FIG. 28 is a diagram illustrating exemplary display content of a bitmap file of an ink image for each ink type shown in FIG. 26.

FIG. 28 is a diagram illustrating exemplary display content of a bitmap file of an ink image for each ink type shown in FIG. 26. In FIG. 28, a display content 218 of the bitmap file (CI-Color.bmp) of a color ink image is shown when the amount of remaining ink is full. Also shown is a display content 219 of the bitmap file (CI-Photo.bmp) of a photo ink image when the amount of remaining ink is full.

Figure 29:
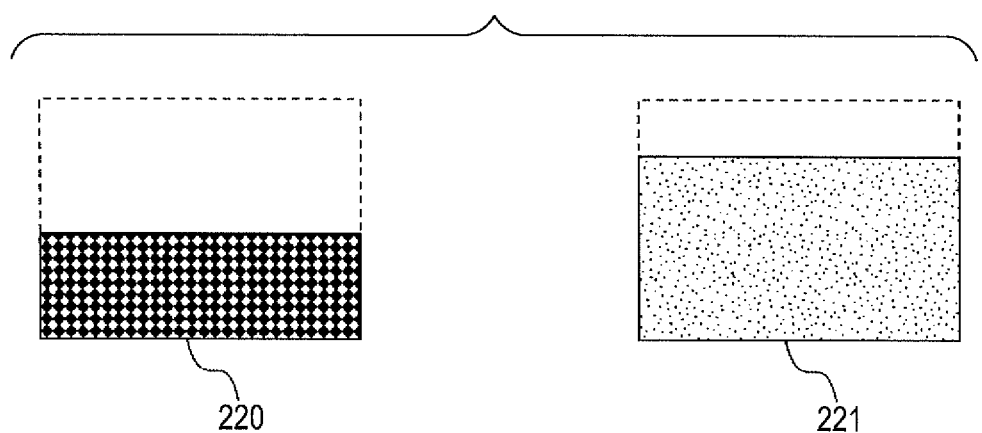
FIG. 29 is a diagram illustrating exemplary display content of a bitmap file of a remaining ink image for each ink type.

FIG. 29 is a diagram illustrating exemplary display content of a bitmap file of a remaining ink image for each ink type. In FIG. 29, a display content 220 of a bitmap file of a color ink image is shown when the remaining ink level is 40%. Also shown is a display content 221 of a bitmap file of a photo ink image when the remaining ink level is 80%. The dotted lines in the drawing are representative of full levels of ink, however, the dotted lines are not displayed in practice.

FIGS. 20 and 30 illustrate diagrams of exemplary schemas used by the application 30 to acquire the ink information and ink condition from the printer 3. These schemas are specified as arguments when the application 30 calls the API function IBidiSpl::SendRecv( ) of the COM interface IBidiSpl used for Windows® XP OS in order to acquire the ink information and ink condition from the printer 3 using the LM 36 via the Printing and Print Spooler Interfaces. Since FIG. 20 has already been described above, the description is not repeated here.

In FIG. 30, ImageData is Property representing image information of ink of a color specified by [Color]. The full path specification of the schema is \Printer.InkInfo.[Color].ImageData. This ink image information is information which pertains to when the amount of remaining ink is full.

Red is Value representing a red component of an image of color specified by [Color]. The data type is Int. The full path specification of the schema is \Printer.InkInfo.[Color].ImageData:Red. Available setting value is an integer in the range from 0 to 255.

Green is Value representing a green component of an image of color specified by [Color]. The data type is Int. The full path specification of the schema is \Printer.InkInfo.

[Color].ImageData:Green. Available setting value is an integer in the range from 0 to 255.

Blue is Value representing a blue component of an image of color specified by [Color]. The data type is Int. The full path specification of the schema is \Printer.InkInfo.[Color].ImageData:Blue. Available setting value is an integer in the range from 0 to 255.

Width is Value representing the width of an image of color specified by [Color]. The data type is Int. The full path specification of the schema is \Printer.InkInfo.[Color].ImageData:Width. Available setting value is an integer in the range from 0 to 100 (pixels).

Depth is Value representing the depth of an image of color specified by [Color]. The data type is Int. The full path specification of the schema is \Printer.InkInfo.[Color].ImageData:Depth. Available setting value is an integer in the range from 0 to 100 (pixels).

Height is Value representing the height of an image of color specified by [Color]. The data type is Int. The full path specification of the schema is \Printer.InkInfo.[Color].ImageData:Height. Available setting value is an integer in the range from 0 to 100 (pixels).

In FIGS. 20 and 30, Values, such as Installed, State, ModelName, Direction, Order, Red, Green, Blue, Width, Depth, and Height, are values returned from the LM 36 or the printer 3 to the application 30. Thus, by using the schemas defined in FIGS. 20 and 30, the application 30 can acquire the ink information and ink condition, and more specifically, the remaining ink level, the direction of arrangement of ink tanks, and the order of arrangement of the ink tanks, and the ink image information.

The following is a comparison between schemes shown in FIGS. 21 and 30. In FIG. 21, an ink image of a color specified by [Color] is defined by a bitmap file (binary data) having Data Type of Bitmap using a schema of Image, whereas, in FIG. 30, an ink image of a color specified by [Color] is defined by integers having Data Type of Int using schemas Red, Green, Blue, Width, Depth, and Height of ImageData.

The scheme shown in FIG. 21 allows any application to display the conditions of ink installed in the printer 3 (e.g., the shape of a ink tank, a color of ink, the size of an ink tank, a direction of arrangement of ink tanks, the order of the arrangement, and a remaining ink level) in a visually realistic manner by using accurate graphics, thus increasing the user operability. However, since Data Type of the schema representing an ink image of a color specified by [Color] is Bitmap and actual data transferred from the LM 36 or the printer 3 to the application 30 is a bitmap file, the transferred data becomes large.

On the other hand, with respect to the scheme shown in FIG. 30, since Data Type of the schemas of Red, Green, Blue, Width, Depth, and Height of ImageData representing an ink image of a color specified by [Color] is Int and the transferred data from the LM 36 or the printer 3 to the application 30 are six integers representing Red, Green, Blue, Width, Depth, and Height, the transferred data can be considerably reduced. Also, with respect to the scheme shown in FIG. 30, the three-dimensional display can be easily controlled by using the definitions of Width, Depth, and Height. However, with respect to the scheme shown in FIG. 30, the graphical presentation of the shape of an ink tank, a color of ink, the size of an ink tank, a direction of arrangement of ink tanks, the order of the arrangement, and a remaining ink level is visually less desirable to that using the schema of Image representing an ink image shown in FIG. 21.

As a result, both the Image shown in FIG. 21 and ImageData shown in FIG. 30 have varying characteristics, and the decision of which schema is used depends on the environment of the used peripheral device control system. Accordingly, it is ideal that a system that uses one of the schemas suitable for the environment is developed.

For example, it is desirable that a system whose data transfer rate from the LM 36 or the printer 3 to the application 30 is high, as the peripheral device control system shown in FIG. 1, employs the schema of Image, shown in FIG. 21, that can display the shape of an ink tank, a color of ink, the size of an ink tank, a direction of arrangement of ink tanks, the order of the arrangement, and a remaining ink level in a visually realistic manner by using accurate graphics.

FIG. 31 illustrates a diagram of an exemplary schema and the values when ink information and ink condition are enumerated using schemas shown in FIGS. 20 and 30. As shown in FIG. 31, the application 30 (e.g., status monitor) calls the IBidiSpl::SendRecv( ) function by specifying a schema of \Printer.InkInfo. Thereafter, a set of a schema Query(Schema), a schema (Retrieve(Schema)) of ink information and ink condition, a direction of arrangement of ink tanks, and the order of arrangement of ink tank in the printer 3, and their values (Retrieve(Value)) is returned.

In the example shown in FIG. 31, a black ink tank, a yellow ink tank, a magenta ink tank, and a cyan ink tank are installed in the printer 3. The remaining ink levels in these ink tanks are 80%, 50%, 0% (no remaining ink), and a 100% (full remaining ink), respectively. The types of the ink are CI-B, CI-Y, CI-M, and CI-C, respectively. The direction of arrangement of the ink tanks is from left to right. The order of the arrangement is black, yellow, magenta, and cyan from the left. The ink image information is information shown by each value (Retrieve(Value)) of Red, Green, Blue, Width, Depth, and Height of Property in ImageData shown in FIG. 31.

Thus, by enumerating the ink information and ink condition, the application 30 can acquire the ink information and ink condition, and more specifically, the remaining ink level, the direction of arrangement of the ink tanks, the order of arrangement of the ink tanks, and the ink image information.

It should be noted that the order of arrangement of the ink is different from that of the first embodiment shown in FIG. 7. The printer 3 can include a plurality of types of ink heads. In this example, an ink head having a type different from that shown in FIG. 7 is installed in the printer 3.

FIG. 32 illustrates a diagram of an exemplary database of ink information. As shown in FIG. 32, the database contains the direction of arrangement of ink tanks (Direction), the order of arrangement of the ink tanks (Order), the ink image (Image), and the ink image information (ImageData) for each color (Ink Color), namely, for black (Black), yellow (Yellow), magenta (Magenta), or cyan (Cyan). In ImageData, the values of Red, Green, Blue, Width, Depth, and Height are stored in this order. The database is stored in the LM resource file 6.

FIG. 33 illustrates another diagram of an exemplary database of ink information. As shown in FIG. 33, the database contains the direction of arrangement of ink tanks (Direction), the order of arrangement of the ink tanks (Order), and the ink image (Image) for each color (Ink Color), namely, for color ink (Color) in which yellow, magenta, and cyan ink are integrated or photo ink (Photo) in which special ink of three colors for photo printing are integrated. The database is stored in the LM resource file 6.

FIG. 34 illustrates a diagram of exemplary data for the PC 1 to acquire ink information from the printer 3. In practice, binary data is communicated between the PC 1 and the printer 3. However, for the sake of simplicity, text data encoded with ASCII character code is shown in FIG. 34. When the PC 1 submits a request command to the printer 3 via the USB interface 9, ink information is returned from the printer 3 to the PC 1 via the USB interface 9. The ink information includes the items listed in Table III.

TABLE III

| Color | Type | State |
|---|---|---|
| Black | CI-B | 80% |
| Yellow | CI-Y | 50% |
| Magenta | CI-M | 0% |
| Cyan | CI-C | 100% |

FIG. 35 illustrates a diagram of exemplary data for the PC 1 to acquire ink information from the printer 3. In practice, binary data is communicated between the PC 1 and the printer 3. However, for the sake of simplicity, text data encoded with ASCII character code is shown in FIG. 35. When the PC 1 submits a request command to the printer 3 via the USB interface 9, ink information is returned from the printer 3 to the PC 1 via the USB interface 9. The ink information includes the items listed in Table IV.

TABLE IV

| Color | Type | Amount of remaining ink | Direction of arrangement | Order of arrangement | Image |
|---|---|---|---|---|---|
| Black | CI-B | 80% | Left to right | 1 | Bitmap file of CI-B.bmp |
| Yellow | CI-Y | 50% | Left to right | 2 | Bitmap file of CI-Y.bmp |
| Magenta | CI-M | 0% | Left to right | 3 | Bitmap file of CI-M.bmp |
| Cyan | CI-C | 100% | Left to right | 4 | Bitmap file of CI-C.bmp |

FIG. 36 illustrates a diagram of data for the PC 1 to acquire ink information from the printer 3. In practice, binary data is communicated between the PC 1 and the printer 3. However, for the sake of simplicity, text data encoded with ASCII character code is shown in FIG. 36. When the PC 1 submits a request command to the printer 3 via the USB interface 9, ink information is returned from the printer 3 to the PC 1 via the USB interface 9. The entry "Image Information" contains values (Values) corresponding to Red, Green, Blue, Width, Depth, and Height in this order. The ink information includes the items listed in Table V.

TABLE V

| Color | Type | Amount of remaining ink | Direction of arrangement | Order of arrangement | Image Information |
|---|---|---|---|---|---|
| Black | CI-B | 80% | Left to right | 1 | 0 0 0 65 100 75 |
| Yellow | CI-Y | 50% | Left to right | 2 | 255 255 0 25 100 75 |
| Magenta | CI-M | 0% | Left to right | 3 | 255 0 255 25 100 75 |
| Cyan | CI-C | 100% | Left to right | 4 | 0 255 255 25 100 75 |

FIG. 37 illustrates a diagram of data for the PC 1 to acquire ink information from the printer 3. In practice, binary data is communicated between the PC 1 and the printer 3. However, for the sake of simplicity, text data encoded with ASCII character code is shown in FIG. 37. When the PC 1 submits a request command to the printer 3 via the USB interface 9, ink information is returned from the printer 3 to the PC 1 via the USB interface 9. The ink information includes the items listed in Table IV.

TABLE VI

| Color | Type | State |
|---|---|---|
| Color | CI-Color | 40% |
| Photo | CI-Photo | 80% |

FIG. 38 illustrates a diagram of data for the PC 1 to acquire ink information from the printer 3. In practice, binary data is communicated between the PC 1 and the printer 3. However, for the sake of simplicity, text data encoded with ASCII character code is shown in FIG. 38. When the PC 1 submits a request command to the printer 3 via the USB interface 9, ink information is returned from the printer 3 to the PC 1 via the USB interface 9. The ink information includes the items listed in Table VII.

TABLE VII

| Color | Type | Amount of remaining ink | Direction of arrangement | Order of arrangement | Image |
|---|---|---|---|---|---|
| Color | CI-Color | 40% | Bottom to top | 1 | Bitmap file of CI-Color.bmp |
| Photo | CI-Photo | 80% | Bottom to top | 2 | Bitmap file of CI-Photo.bmp |

The printer 3 acquires information of the installed ink and converts the acquired data to a predetermined data format so as to obtain data shown in FIGS. 34 through 38. Upon receiving a request command from the PC 1, the printer 3 generates data representing ink information by carrying out the above-described series of processes and transmits the generated data to the PC 1. Since this process carried out by the printer 3 is well-known for a widely used peripheral device, such as a normal printer, the detailed description with reference to the accompanying drawings is not provided here.

[Exemplary Operation of the Second Embodiment]

Exemplary operation of the second embodiment is now herein described below with reference to FIGS. 39 through 41.

FIG. 39 is a flow chart of an exemplary process for updating the display of ink information after the application 30 acquires the ink information from the printer 3. The application 30 starts a process for receiving ink information from the printer 3 and updating the display of the ink information (step S3901). The application 30 then calls the API function IBidiSpl::SendRecv( ) of the COM interface IBidiSpl by specifying a schema of \Printer.InkInfo shown in FIGS. 20 and 21 or FIGS. 20 and 30 as an argument so as to start acquiring the ink information (step S3902). Thereafter, the SendRecvBidiDataFromPort( ) function, which the LM 36 exports, is called by the spooler via the Printing and Print Spooler Interfaces and the process of the function starts (step S3903). The detailed description and the drawings of the spooler are not shown here, since the spooler is one of known functions of Windows® XP.

As shown in FIGS. 34 through 38, a request command is submitted from the PC 1 using the SendRecvBidiDataFromPort( ) function of the LM 36, and ink information returned from the printer 3 is acquired (step S3904). The LM 36 then converts the acquired information to a schema in accordance with the schema definition of \Printer.InkInfo specified as the argument of the SendRecvBidiDataFromPort( ) function (step S3905). This processing is described in detail below with reference to FIG. 40.

The LM 36 then returns the ink information converted to the schema definition shown in FIG. 22 or 31 as an argument of the SendRecvBidiDataFromPort( ) function, and the process of the SendRecvBidiDataFromPort( ) function of the LM 36 is completed (step S3906). The IBidiSpl::SendRecv ( ) function is returned to the application 30, and therefore, the application 30 acquires the ink information of the returned schema definition shown in FIG. 22 or 31 as the argument of the function (step S3907).

The application 30 then generates ink information display data (step S3908), which is described below with reference to FIG. 41. Thereafter, the application 30 updates ink information using this data (step S3909). The process for updating the display of ink information after the application 30 acquires the ink information from the printer 3 is then completed (step S3910).

In general, the application 30 repeats the process starting from step S3901, which updates the display of ink information after the application 30 acquires the ink information from the printer 3, at predetermined intervals, for example, once per five seconds. Thus, the application 30 can display the information and condition of ink installed in the printer 3 in real time.

Thus, by carrying out the above-described series of processing, the application 30 (any application, such as the status monitor shown in FIG. 23 or 27) can display the conditions of ink installed in the printer 3 (e.g., the shape of an ink tank, a color of ink, the size of an ink tank, a direction of arrangement of ink tanks, the order of the arrangement, and the remaining ink level) in a visually realistic manner by using accurate graphics.

[Exemplary Process for Converting Ink Information to a Schema Definition]

Figure 40:
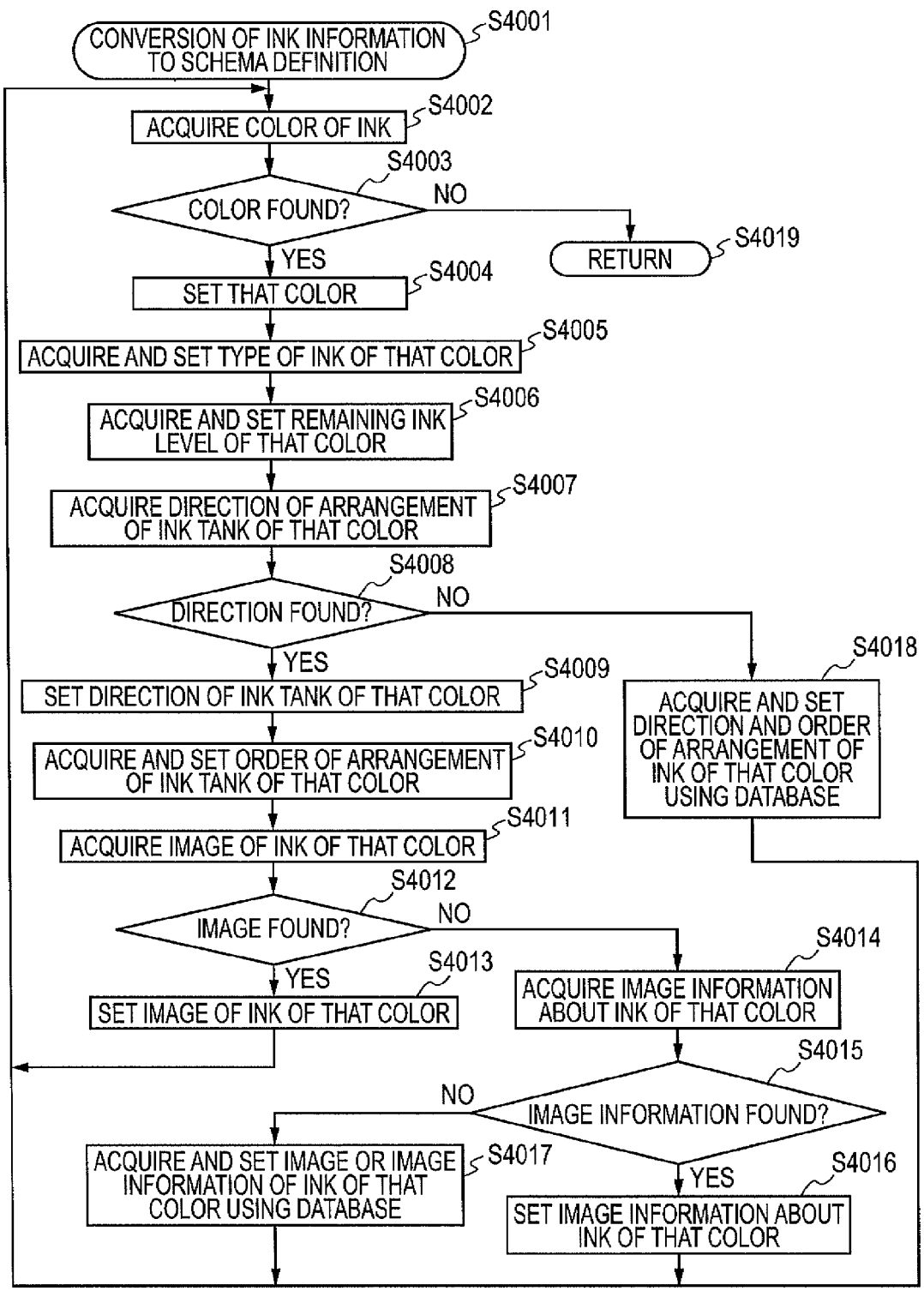
FIG. 40 is a flow chart of an exemplary process for converting ink information to a schema definition in an LM.

FIG. 40 is a flow chart of an exemplary process for converting ink information to a schema definition in the LM 36. The LM 36 starts converting ink information to a schema definition (step S4001) to acquire the color of ink from ink information returned from the printer 3 at step S3904 shown in FIG. 39 (step S4002). Subsequently, if the color is specified, that is, if the color is found (step S4003), the LM 36 stores the color in a return-value storing buffer (memory) used at a return time at step S4019 (step S4004). The LM 36 then acquires the type of ink of that color and stores it in the return-value storing buffer (memory) used at a return time at step S4019 (step S4005).

Subsequently, the LM 36 acquires the remaining ink level of that color and stores it in the return-value storing buffer (memory) used at a return time at step S4019 (step S4006). The LM 36 then acquires the direction of arrangement of ink of that color (step S4007). If the direction of arrangement is specified, that is, if the direction of arrangement is found (step S4008), the LM 36 stores the direction of arrangement of ink of that color in the return-value storing buffer (memory) used at a return time at step S4019 (step S4009).

Thereafter, the LM 36 acquires the order of arrangement of ink of that color and stores it in the return-value storing buffer (memory) used at a return time at step S4019 (step S4010). The LM 36 then acquires the image of ink of that color (S4011). If the image of ink is specified, that is, if the color is found (step S4012), the LM 36 stores the image of ink of that color in the return-value storing buffer (memory) used at a return time at step S4019 (step S4013). The process then returns to step S4002.

If, at step S4012, the image is not specified, that is, if the image is not found, the LM 36 acquires image information of the ink of that color (step S4014). If the image information is specified, that is, if the image information is found (step S4015), the LM 36 stores the image information of ink of that color in the return-value storing buffer (memory) used at a return time at step S4019 (step S4016). The process then returns to step S4002.

If, at step S4015, the image information is not specified, that is, if the image information is not found, the LM 36 acquires the image or information of ink of that color from the database of ink information shown in FIG. 32 or 33. Subsequently, the LM 36 stores the image information in the return-value storing buffer (memory) used at a return time at step S4019 (step S4017). The process then returns to step S4002. If, at step S4017, the database of ink information contains both the image of ink and the image information of ink, the LM 36 is controlled to select the optimum one for the environment of the peripheral device control system at that time.

In this example, since the peripheral device control system is that shown in FIG. 1, the data transfer rate from the LM 36 or the printer 3 to the application 30 is high. Accordingly, when both the image of ink and the image information of ink are found, the LM 36 selects the image of ink and stores it.

Additionally, if at step S4008, the direction of arrangement is not specified (i.e., if the direction of arrangement is not found), the LM 36 acquires the direction of arrangement and the order of arrangement of ink of that color from the database of ink information shown in FIG. 32 or 33. The LM 36 stores the direction of arrangement and the order of arrangement in the return-value storing buffer (memory) used at a return time at step S4019 (step S4018). The process then returns to step S4002.

And if, at step S4003, the color is not specified (i.e., if the color is not found), it is determined that the processes for all the colors are completed. Accordingly, the process returns with the return values of the color ([Color] shown in FIG. 20), the type of the ink of that color (ModelName shown in FIG. 20), the remaining ink level (Level shown in FIG. 20), the direction of arrangement (Direction shown in FIG. 20), the order of arrangement (Order shown in FIG. 20), the image (Image shown in FIG. 21), and the image information (Red, Green, Blue, Width, Depth, and Height of ImageData shown in FIG. 30) stored in the return-value storing buffer (step S4019).

Figure 41:
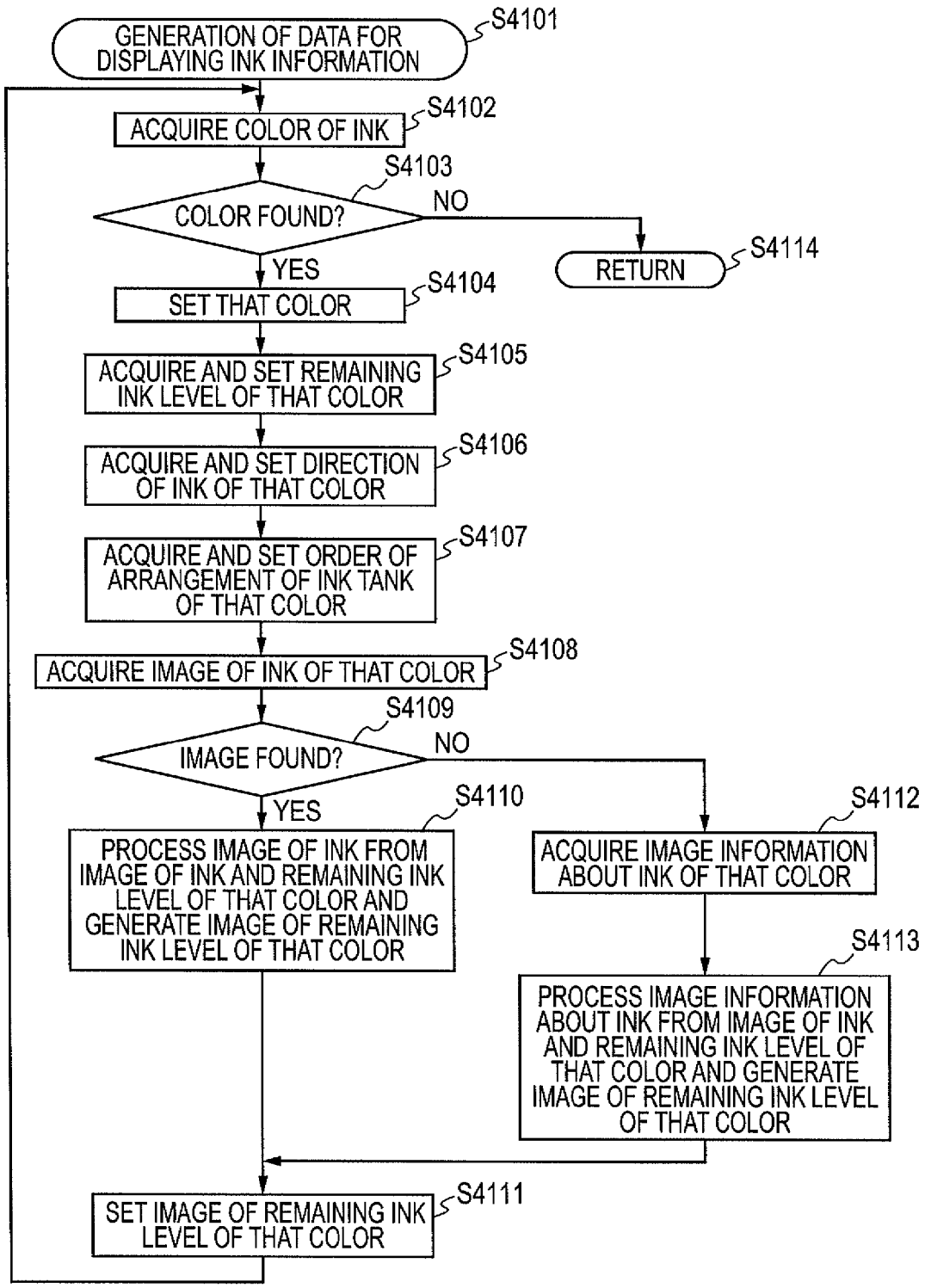
FIG. 41 is a flow chart of an exemplary process for generating ink information display data in an application.

FIG. 41 is a flow chart of an exemplary process for generating ink information display data in the application 30. The application 30 starts a process for generating ink information display data (step S4101). The application 30 then acquires the color of ink from the ink information which was returned at step S3907 as a schema definition shown in FIG. 22 or 31 and as an argument of the API function IBidiSpl::SendRecv( ) (step S4102). Thereafter, if the color is specified, that is, if the color is found (step S4103), the application 30 stores the color in a return-value storing buffer (memory) used at a return time at step S4114 (step S4104).

The application 30 then acquires a remaining ink level of that color and stores it in the return-value storing buffer (memory) used at a return time at step S4114 (step S4105).

The application 30 then acquires the direction of arrangement of the ink of that color and stores it in the return-value storing buffer (memory) used at a return time at step S4114 (step S4106). The application 30 then acquires the order of arrangement of the ink of that color and stores it in the return-value storing buffer (memory) used at a return time at step S4114 (step S4107). The application 30 then acquires the image of the ink of that color (step S4108).

If the image is specified, that is, if the image is found (step S4109), the application 30 generates the image of a remaining ink level of that color by processing the image of the ink of that color using the remaining ink level of that color which is acquired at step S4105 and stored in the buffer (memory) (step S4110). The application 30 then stores the image of the remaining ink level of that color in the return-value storing buffer (memory) used at a return time at step S4114 (step S4111). The process then returns to step S4102.

When the image of remaining ink level of that color is generated at step S4110, the image of remaining ink level of each color shown in FIG. 25 or 29 can be obtained by changing the height of ink in the bitmap file of each color shown in FIG. 24 or 28 using the following equation (1):

$$\text{(the height of ink image of a color)} \times \text{(a remaining ink level of that color (i.e., Level in FIG. 20))} / 100 \quad (1)$$

If the image is not specified at step S4109, that is, if the image is not found, the application 30 acquires the image information of ink of that color (step S4112). Thereafter, the application 30 generates the image of a remaining ink level of that color by processing the image information of the ink of that color using the remaining ink level of that color which is acquired and stored in the buffer (memory) at step S4105 (step S4113). The process then proceeds to step S4111.

When the image of a remaining ink level of that color is generated at step S4113, the image of a full amount of remaining ink of each color is generated using the Windows® GDI function first on the basis of the values of Red, Green, Blue, Width, Depth, and Height of the image information of ink (ImageData) shown in FIG. 30, and more particularly, the values (Value) shown in FIG. 31.

Here, since the PC 1 has a two-dimensional user interface for the display in the PC 1, the ink image is generated while ignoring the value of Depth. Consequently, ink images similar to the ink images shown in FIG. 24 or 28 can be obtained.

The process is described below while ignoring the value of Depth. The image of a remaining ink level of each color similar to that shown in FIG. 25 or 29 can be obtained by changing the height of ink in the generated ink image of each color using the following equation (2):

$$\text{(the height of ink image of a color)} \times \text{(a remaining ink level of that color (i.e., Level in FIG. 20))} / 100 \quad (2)$$

If, at step S4103, the color is not specified, that is, if the color is not found, it is determined that the processes for all the colors are completed. Accordingly, the process returns with the return values of the color ([Color] shown in FIG. 20), the remaining ink level of that color (Level shown in FIG. 20), the direction of arrangement of the ink (Direction shown in FIG. 20), the order of arrangement (Order shown in FIG. 20), the image (Image shown in FIG. 21), the image information (Red, Green, Blue, Width, Depth, and Height of ImageData shown in FIG. 30), and the image of a remaining ink level obtained by changing the height using equation (1) or (2) stored in the return-value storing buffer (step S4114).

In the above-described example, the application 30 carries out the process while ignoring the value of Depth (Depth=100 in the example shown in FIG. 31), which represents the depth of an image of a color specified by [Color]. This is because the peripheral device control system in this example operates on Windows® XP and uses a two-dimensional user interface for a display in the PC 1. However, a three-dimensional user interface can be provided by controlling an image using the Depth, which represents the depth of an image of a color specified by [Color].

Third Exemplary Embodiment

A peripheral device control system according to a third exemplary embodiment of the present invention is described below with reference to the peripheral device control system of the first embodiment described in relation to FIGS. 1 and 2. The following detailed description is provided using the peripheral device control system shown in FIG. 1.

FIG. 43 illustrates diagrams exemplary schemas used by an application 30 (e.g., status monitor) to acquire the ink information and ink condition from a printer 3. These schemas are specified as arguments when the application 30 calls the API function IBidiSpl::SendRecv( ) of the COM interface IBidiSpl used for Windows® XP OS in order to acquire the ink information and ink condition from the printer 3 using the LM 36 via the Printing and Print Spooler Interfaces.

In FIG. 43, InkInfo is Property representing ink information. The full path specification of the schema is \Printer.InkInfo.

[Color] is Property representing color information. The full path specification of the schema is \Printer.InkInfo.[Color]. A value specified for the schema is one of Black, which represents a black color; Cyan, which represents a cyan color; Magenta, which represents a magenta color; Yellow, which represents a yellow color; Photo, which represents integrated photo ink; and Color, which represents integrated color ink. For example, if the application 30 wants to acquire information about black ink, the application 30 specifies \Printer.InkInfo.Black.

Installed is a Value which represents whether ink of a color specified by [Color] is installed or not. The data type is Boolean. The full path specification of the schema is \Printer.InkInfo.[Color]:Installed. Available setting value is True, which indicates "installed", or False, which indicates "not installed".

State is a Value which represents a remaining ink level of a color specified by [Color]. The data type is String. The full path specification of the schema is \Printer.InkInfo.[Color]:State. Available setting value is Full, which indicates a full amount of remaining ink; Low, which indicates a small amount of remaining ink; Out, which indicates mo amount of remaining ink; or Unknown, which indicates an unknown remaining ink level.

ModelName is a Value which represents the type of ink of a color specified by [Color]. The data type is String. The full path specification of the schema is \Printer.InkInfo.[Color]:ModelName. Available setting value is ASCII strings shown by Examples in FIG. 43.

Direction is a Value which represents the direction of arrangement of ink of a color specified by [Color]. The data type is String. The full path specification of the schema is \Printer.InkInfo.[Color]:Direction. Available setting value is LeftRight, which indicates a direction of the arrangement from left to right when a point of origin is located at the lower left of the printer; FrontBack, which indicates a direction of the arrangement from front to rear; or BottomTop, which indicates a direction of the arrangement from bottom to top.

Order is a Value which represents the order of arrangement of ink tank of a color specified by [Color] from the point of origin. The point of origin is located at the lower left of the printer. The data type is Int. The full path specification of the schema is \Printer.InkInfo.[Color]:Order. For example, a value of 1 is set if the order of arrangement of ink of a color specified by [Color] is first from the point of origin.

InsertDirection is a Value which represents a direction of ink tank insertion of a color specified by [Color]. The data type is String. The full path specification of the schema is \Printer.InkInfo.[Color]:InsertDirection. Available setting value is LeftToRight, which indicates a direction from left to right when a point of origin is located at the lower left of the printer; FrontToBack, which indicates a direction from front to rear; BottomToTop, which indicates a direction from bottom to top; or TopToBottom, which indicates a direction from top to bottom.

The value Installed, State, ModelName, Direction, Order, and InsertDirection are values returned from the LM 36 or the printer 3 to the application 30. Thus, the application 30 can acquire the ink information and ink condition, the direction of arrangement of the ink tank, the order of arrangement of the ink tank, and a direction of ink tank insertion using the schemas shown in FIG. 43.

FIG. 44 illustrates a diagram of an exemplary schema and the values when the ink information and ink condition, the direction of arrangement of ink, the order of arrangement, and the direction of ink tank insertion are enumerated using the schemas shown in FIG. 43. As shown in FIG. 44, the application 30 (e.g., status monitor) calls the IBidiSpl::SendRecv( ) function by specifying a schema of \Printer.InkInfo. Thereafter, a set of a schema Query(Schema), a schema (Retrieve(Schema)) of the ink information and the ink condition, the direction of arrangement, the order of arrangement, and the direction of insertion of all the ink in the printer 3, and their values (Retrieve(Value)) is returned.

In the example shown in FIG. 44, a black ink tank and an integrated color ink tank are installed in the printer 3. The remaining ink levels in these ink tanks are none (Out). The types of the ink are CI-B and CI-Color, respectively. The direction of arrangement of the ink tanks is from left to right. The order of the arrangement of the ink tank is black and color from the left. The direction of ink tank insertion is oriented from bottom to top.

FIG. 45 is a display screen of the application 30 (e.g., status monitor) when the application 30 displays an out-of-ink error using graphics and using the schemas shown in FIG. 43. Here, ink having an out-of-ink error is displayed in a field 300 using character strings. In a field 301, the direction of arrangement of ink tanks, the order of arrangement, the remaining ink level, and the direction of ink tank insertion are displayed using graphics. As can be seen from FIG. 45, ink tanks are arranged in the order of black (302) and color (303) from the left. The remaining ink levels in the two tanks are none (Out). The directions of insertion of the two tanks are oriented from bottom to top.

FIG. 46 illustrates a diagram of an exemplary schema and the values when ink information of a printer whose direction of ink tank insertion is horizontal is enumerated. In the example shown in FIG. 46, a black ink tank (Black) and an integrated color ink tank (Color) are installed in the printer 3. The amounts of remaining ink are full (Full) for black and out-of-ink (Out) for color. The types of the ink are CI-B and CI-Color, respectively. The direction of arrangement of the ink tanks is from bottom to top. The order of the arrangement is color and black from the bottom. The direction of insertion of each ink is oriented from left to right.

FIG. 47 is an exemplary display screen of the application 30 (e.g., status monitor) when the application 30 displays an out-of-ink error using graphics and using the schemas shown in FIG. 46. Here, ink having an out-of-ink error is displayed in a field 304 using character strings. In a field 305, the direction of arrangement, the order of arrangement, the remaining ink level, and the direction of insertion of the ink tank are displayed using graphics. As can be seen from FIG. 47, ink tanks are arranged in the order of color (307) and black (306) from the bottom. The amounts of remaining ink in the two tanks are full (Full) for black and none (Out) for color. The directions of insertion of the two tanks are oriented from left to right.

FIG. 48 illustrates a diagram of exemplary data for the PC 1 to acquire ink information from the printer 3. In practice, binary data is communicated between the PC 1 and the printer 3. However, for the sake of simplicity, text data encoded with ASCII character code is shown in FIG. 48. When the PC 1 submits a request command to the printer 3 via the USB interface 9, ink information is returned from the printer 3 to the PC 1 via the USB interface 9. The ink information includes the following items listed in Table VIII.

TABLE VIII

| Color | Type | State | Direction of arrangement | Order of arrangement |
|---|---|---|---|---|
| Black | CI-B | Out of ink | Left to right | 1 |
| Color | CI-Color | Out of ink | Left to right | 2 |

Like FIG. 48, FIG. 49 illustrates a diagram of exemplary data for the PC 1 to acquire ink information from the printer 3. Unlike FIG. 48, the PC 1 acquires a direction of ink tank insertion from the printer 3. The ink information includes the following items listed in Table IX. Thus, there are two types of printers: one can return information about a direction of ink tank insertion (see FIG. 49) and the other cannot (see FIG. 48).

TABLE IX

| Color | Type | State | Direction of arrangement | Order of arrangement | Direction of ink tank insertion |
|---|---|---|---|---|---|
| Black | CI-B | Out of ink | Left to right | 1 | Bottom to top |
| Color | CI-Color | Out of ink | Left to right | 2 | Bottom to top |

[Exemplary Operation of the Third Embodiment]

The operation of the present embodiment is described below with reference to flow charts shown in FIGS. 50 through 52. FIG. 50 is a flow chart of a process for updating the display of ink information after the application 30 (e.g., status monitor) acquires the ink information from the printer 3. Here, the printer 3 can return information about the direction of arrangement of ink tanks and the order of the arrangement, but not the direction of ink tank insertion.

As shown in FIG. 50, the application 30 starts a process for receiving ink information from the printer 3 and updating the display of the ink information (step S5001). The application 30 calls the API function IBidiSpl::SendRecv( ) of the COM interface IBidiSpl by specifying a schema of \Printer.InkInfo shown in FIG. 43 as an argument to start acquiring the ink information (step S5002). Thereafter, the SendRecvBidiDataFromPort( ) function, which the LM 36 exports, is called by the spooler of the Windows® XP OS via the Printing and Print Spooler Interfaces and the process of the function starts (step S5003).

A request command shown in FIG. 48 is submitted from the PC 1 using the SendRecvBidiDataFromPort( ) function of the LM 36, and ink information returned from the printer 3 is acquired (step S5004).

Furthermore, the LM 36 acquires the direction of ink tank insertion stored in the application 30 itself (step S5005). The LM 36 then converts the acquired information to a schema definition in accordance with the schema definition of \Printer.InkInfo specified as the argument of the SendRecvBidiDataFromPort( ) function (step S5006). The LM 36 then returns the ink information converted to the schema definition as an argument of the SendRecvBidiDataFromPort( ) function, and the process of the SendRecvBidiDataFromPort( ) function of the LM 36 is completed (step S5007).

The IBidiSpl::SendRecv( ) function is returned to the application 30, and therefore, the application 30 acquires the schema definition of the ink information returned as the argument of the function (step S5008). The application 30 updates ink information using this returned ink information (step S5009). The process is then completed (step S5010).

In general, the application 30 repeats the process starting from step S5001, which updates the display of ink information after the application 30 acquires the ink information from the printer 3, at predetermined intervals, for example, once per five seconds. Thus, the application 30 can display the information and condition of the ink tank installed in the printer 3 in real time.

Like FIG. 50, FIG. 51 is a flow chart of an exemplary process for updating the display of ink information after the application 30 (e.g., status monitor) acquires the ink information from the printer 3. Here, the printer 3 can return information about the direction of arrangement of ink tanks, the order of the arrangement, and the direction of ink tank insertion.

As shown in FIG. 51, the application 30 starts a process for receiving ink information from the printer 3 and updating the display of the ink information (step S5101). The application 30 calls the API function IBidiSpl::SendRecv( ) of the COM interface IBidiSpl by specifying a schema of \Printer.InkInfo shown in FIG. 43 as an argument to start acquiring the ink information (step S5102). Thereafter, the SendRecvBidiDataFromPort( ) function, which the LM 36 exports, is called by the spooler of the Windows® XP OS via the Printing and Print Spooler Interfaces and the process of the function starts (step S5103).

A request command shown in FIG. 49 is submitted from the PC 1 using the SendRecvBidiDataFromPort( ) function of the LM 36, and ink information, such as the remaining ink level, the direction of arrangement of ink tanks, the order of arrangement, and the direction of ink tank insertion, is acquired from the printer 3 (step S5104). Subsequently, the LM 36 converts the acquired information to a schema definition in accordance with the schema definition of \Printer.InkInfo specified as the argument of the SendRecvBidiDataFromPort( ) function (step S5105).

The LM 36 then returns the ink information converted to the schema definition as an argument of the SendRecvBidiDataFromPort( ) function, and the process of the SendRecvBidiDataFromPort( ) function of the LM 36 is completed (step S5106). The IBidiSpl::SendRecv( ) function is returned to the application 30, and therefore, the application 30 acquires the schema definition of the ink information returned as the argument of the function (step S5107).

The application 30 then updates ink information using this returned ink information (step S5108). The process for updating the display of ink information after the application 30 acquires the ink information from the printer 3 is then completed (step S5109).

Like FIGS. 50 and 51, FIG. 52 is a flow chart of an exemplary process for updating the display of ink information after the application 30 (e.g., status monitor) acquires the ink information from the printer 3. Here, the LM 36 determines whether the ink information acquired from the printer 3 (see step S5204) contains information about the direction of ink tank insertion (step S5205). If it is determined that the ink information does not contain the direction of ink tank insertion, the LM 36 acquires the direction of ink tank insertion from the internal database of the LM 36 (step S5206).

More specifically, as shown in FIG. 52, the application 30 starts a process for receiving ink information from the printer 3 and updating the display of the ink information (step S5201). The application 30 calls the API function IBidiSpl::SendRecv( ) of the COM interface IBidiSpl by specifying a schema of \Printer.InkInfo shown in FIG. 43 as an argument so as to start acquiring the ink information (step S5202). Thereafter, the SendRecvBidiDataFromPort( ) function, which the LM 36 exports, is called by the spooler of the Windows® XP OS via the Printing and Print Spooler Interfaces and the process of the function starts (step S5203).

A request command shown in FIG. 48 or 49 is submitted from the PC 1 using the SendRecvBidiDataFromPort( ) function of the LM 36, and ink information returned from the printer 3 is acquired (step S5204). Subsequently, the LM 36 determines whether the returned ink information contains information about the direction of ink tank insertion (step S5205). If the information acquired from the printer 3 does not contain information about the direction of ink tank insertion, as shown in FIG. 48, the LM 36 acquires the direction of ink tank insertion stored in the LM 36 itself (step S5206).

In contrast, if the information acquired from the printer 3 contains information about the direction of ink tank insertion, the process proceeds to step S5207. At step S5207, the LM 36 converts the ink information acquired at step S5204 or S5206 to a schema definition in accordance with the schema definition of \Printer.InkInfo specified as the argument of the SendRecvBidiDataFromPort( ) function. The LM 36 then returns the ink information converted to the schema definition as an argument of the SendRecvBidiDataFromPort( ) function, and the process of the SendRecvBidiDataFromPort( ) function of the LM 36 is completed (step S5208).

The IBidiSpl::SendRecv( ) function is returned to the application 30, and therefore, the application 30 acquires the schema definition of the ink information returned as the argument of the function (step S5209). The application 30 updates ink information using this returned ink information (step S5210). The process for updating the display of ink information after the application 30 acquires the ink information from the printer 3 is then completed (step S5211).

The configuration of a data processing program readable by a peripheral device control system including the information processing apparatus and the peripheral device according to this embodiment is described below with reference to a memory map shown in FIG. 42.

Figure 42:
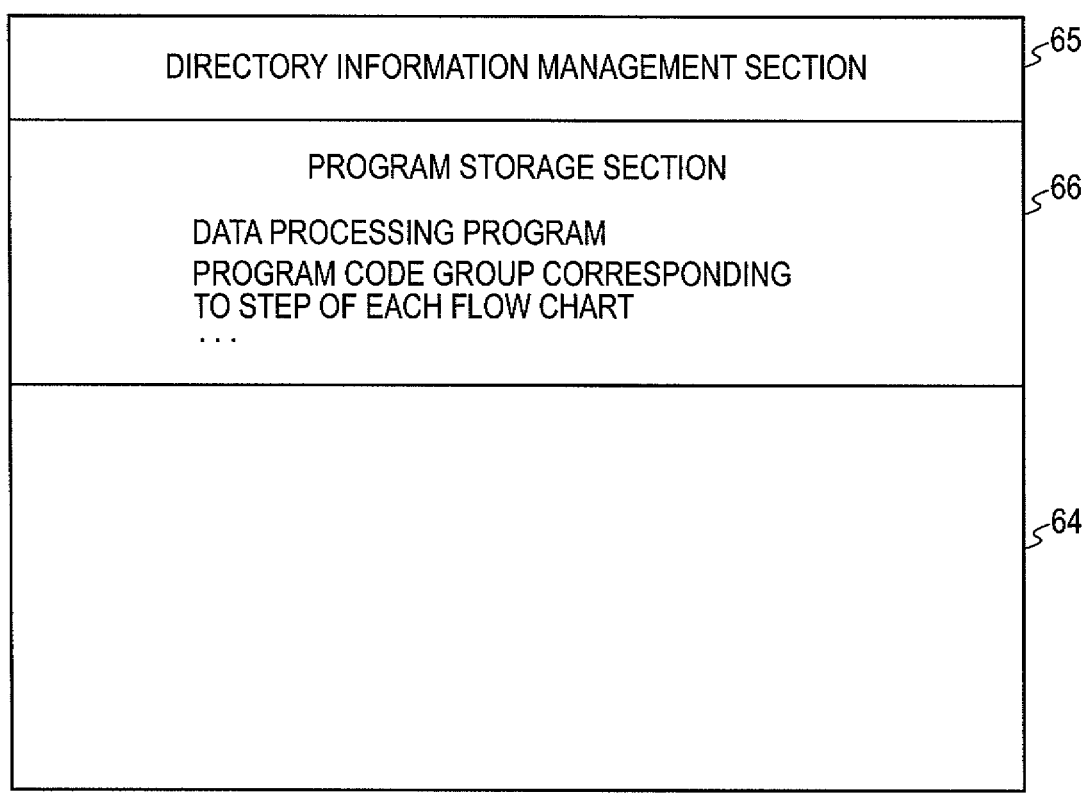
FIG. 42 illustrates an exemplary memory map of a storage medium for storing various data processing programs readable by a peripheral device control system.

FIG. 42 illustrates an exemplary memory map of a storage medium for storing various data processing programs readable by a peripheral device control system according to the present embodiment. Although not shown, information for managing the programs stored in the storage medium, such as version and author information, is also stored in this storage medium. In addition, information depending on an OS which reads out the programs, for example, an icon for identifying the program, may be stored.

As shown in FIG. 42, a storage medium 64 corresponds to the hard disk 1202 in this embodiment. A directory information management section 65 is used for managing data for each program. A program storage section 66 stores a program for installing each program in the information processing apparatus. Furthermore, if the program to be installed is archived, a program for unarchiving the program may be stored in the program storage section 66.

Other Exemplary Embodiments, Features and Aspects of the Present Invention

Programs for performing the processes represented by flow charts shown in FIGS. 15 to 17 of the first embodiment, FIGS. 39 to 41 of the second embodiment, and FIGS. 50 to 52 of the third embodiment are stored in the program storage section 66 to be executed.

The function of each flow chart may be realized by the execution of a program externally installed in the information processing apparatus. In such a case, the present invention is applicable even when information including the program is provided to the information processing apparatus and the peripheral device via a storage medium (e.g., a CD-ROM (compact disk-ROM), a flash memory, and an FD (flexible disk)) or an external storage medium in a network.

While the above-described first to third embodiments of the present invention has been described with reference to a status monitor for the application 30, the status monitor is not intended to be limited to such applications. For example, the present invention can be effectively applied to any application that acquires information from, for example, a peripheral device and utilizes the information.

Additionally, while the above-described first to third embodiments of the present invention has been described with reference to the application 30 (status monitor) that monitors the information and condition of ink installed in the printer 3, the monitor information is not intended to be limited to such applications. For example, the monitor information may include any information, such as the operational status of a peripheral device, an alert, an error status, the mount information of an optional unit.

Additionally, while the above-described first to third embodiments of the present invention has been described with reference to a color inkjet printer, the color inkjet printer is not intended to be limited to such applications. For example, the present invention can be applied to the display of toner installed in an electrophotographic printer (e.g., a color LBP (laser beam printer)).

Furthermore, while the above-described first to third embodiments of the present invention has been described with reference to ink or toner for a consumable supply, the ink or toner is not intended to be limited to such applications. For example, the present invention can be applied to paper. By applying the present invention to paper, an application can display which size of paper or which type of paper is currently loaded in a plurality of cassettes.

Still furthermore, while the above-described first to third embodiments of the present invention has been described with reference to a personal computer for a client or a server, the personal computer is not intended to be limited to such applications. For example, the present invention can be applied to a terminal device that can be used in the same manner as the personal computer. Examples of such terminal devices include a DVD (digital versatile disc) player, a game console, a set-top box, and an Internet appliance.

Still furthermore, while the above-described first to third embodiments of the present invention has been described with reference to a printer for a peripheral device, the printer is not intended to be limited to such applications. For example, the present invention can be applied to a copier, a facsimile, a scanner, a digital camera, a multi-function terminal having the combined function thereof, or the like.

Still furthermore, while the above-described first to third embodiments of the present invention has been described with reference to the Windows® XP OS for an OS, the Windows® XP OS is not intended to be limited to such applications. Any other OS can be used in addition to the Windows® XP OS.

Still Furthermore, while the above-described first to third embodiments of the present invention has been described with reference to the Ethernet® for the network 4, the Ethernet® is not intended to be limited to such applications. Any other network configuration can be used in addition to the Ethernet®.

Still furthermore, while the above-described first to third embodiments of the present invention has been described with reference to a USB interface for an interface between the PC 1 and the printer 3, the USB interface is not intended to be limited to such applications. Any other interface (e.g., the Ethernet®, a wireless LAN, IEEE 1394, Bluetooth, IrDA, parallel, or serial) can be used in addition to the USB interface.

Still furthermore, while the above-described first to third embodiments of the present invention has been described with the case where the application 30 on the PC 1 acquires information about ink installed in the printer 3 or the case where the application 200 on the PC 2 (client) connected to the network 4 acquires information about ink installed in the printer 3 via the PC 1 (server), these cases are not intended to be limited to such applications. For example, even when an OS on the PC 1 supports a multi-user mode and individual users run different applications, the application 30 on the PC 1 and the application 200 on the PC 2 can acquire information about ink installed in a printer from the LM 36 via the Printing and Print Spooler Interfaces. That is, the present invention can be effectively applied to such a multi-user environment.

Still furthermore, while the above-described second embodiment of the present invention has been described with a bitmap file (binary data) for a schema representing an ink image, the bitmap file is not intended to be limited to such applications. For example, any format, such as JPEG or TIFF, can be used for the ink image.

Still furthermore, while the above-described second embodiment of the present invention has been described with a red component (Red), a green component (Green), and a blue component (Blue) for schemas representing the color components of an ink image, these components are not intended to be limited to such applications. For example, any component, such as a black component (Black), a white component (White), a gray component (Gray), a yellow component (Yellow), a magenta component (Magenta), or a cyan component (Cyan) can be used in addition to these color components. Additionally, by using color information representing tint, saturation and brightness, more realistic display can be provided.

Still furthermore, while the above-described second embodiment of the present invention has been described with a width (Width), a depth (Depth), and a height (Height) for schemas representing an ink image, these definitions are not intended to be limited to such applications. For example, any definition representing any shape can be used for the definition. Additionally, by using a definition of a shape, for example, a rectangle parallelepiped and a circular cylinder, more realistic display can be provided.

The present invention can be achieved by supplying a storage medium storing program code of software that achieves the functions of the above-described first to third embodiments to a system or a device and by causing a computer (CPU (central processing unit) or MPU (microprocessing unit)) of the system or device to input and execute the program stored in the storage medium. In such a case, the program code itself read out from the storage medium achieves the functions of the above-described embodiments. Accordingly, the program code and the storage medium storing the program code realize the present invention.

The storage medium for supplying the program code includes, for example, a flexible disk, a hard disk, an optical disk, a magneto optical disk, a CD-ROM (compact diskread-only memory), a CD-R (compact disk-recordable), a magnetic tape, a nonvolatile memory card, and a ROM.

Furthermore, in addition to achieving the functions of the above-described first and second embodiments by the computer executing the readout program code, the functions of the above-described embodiments can be achieved by a process in which an OS running on the computer executes some of or all of the effective functions under the control of instructions of the program code.

Still furthermore, the functions of the above-described embodiments can be achieved by a process in which, after the program code read from a storage medium is stored in a memory of an add-on expansion board inserted in a computer or a memory of an add-on expansion unit connected to a computer, a CPU in the add-on expansion board or in the add-on expansion unit executes some of or all functions of the above-described embodiments under the control of instructions of the program code.

As stated above, according to an embodiment of the present invention, any application including a third-party application not related to the vendor of a peripheral device can display information associated with the peripheral device in detail using accurate and visually realistic graphics. For example, the application can display information indicating the conditions of ink installed in a printer, such as the shape, color, size, the direction of arrangement, the remaining ink level, and the direction of insertion of an ink tank, in a visually realistic manner by using accurate graphics.

Also, the present invention can provide a peripheral device control system having a realistic display of peripheral device information and superior operability. Moreover, according to an embodiment of the present invention, an application easily displays the state of consumables of a peripheral device while taking account of the arrangement of the consumables in the peripheral device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-364441 filed Dec. 16, 2004 and No. 2005-280107 filed Sep. 27, 2005, which are hereby incorporated by reference herein in their entirety.

What is claimed is:

1. An information processing apparatus comprising:
   a memory storing instructions; and
   one or more processors in communication with the memory, the one or more processors configured to execute the instructions to:
   request for information on a color material of a device which performs a process by using the color material;
   acquire, from the device, an RGB value representing a color of the color material as a response to the request of the request unit; and
   generate an image corresponding to an amount of the color material based on the acquired RGB value.

2. The information processing apparatus according to claim 1, further comprising a display configured to display information of the color material using the generated image.

3. The information processing apparatus according to claim 1, wherein the one or more processors is configured to execute the instructions to acquire, from the device, the RGB value, a color name of the color material, a model name of a color material container of the color material and a remaining amount of the color material in the color material container.

4. The information processing apparatus according to claim 3:
   wherein the one or more processors is configured to execute the instructions to provide an application with information about the remaining amount of the color material in the color material container, an alignment sequence of the color material container, and a direction of arrangement of the color material container that indicates a direction in which the color material container is installed in the device as left to right, front to rear, or bottom to top in the device,
   wherein the application is configured to display the remaining amount of color material in the color material container in the alignment sequence according to the direction of arrangement of the color material container on the basis of the information about the remaining amount of the color material in the color material container, and
   wherein the one or more processors is configured to execute the instructions to transfer the information about the remaining amount of the color material in the color material container, the alignment sequence of the color material container, and the direction of arrangement of the color material container received from the device to the application.

5. The information processing apparatus according to claim 4, wherein the one or more processors is configured to execute the instructions to transfer the information about the remaining amount of color material in the color material container, the alignment sequence of the color material container, and the direction of arrangement of the color material container received from the device to the application if the processor is successful in acquiring the information from the device, and
   wherein the one or more processors is configured to execute the instructions to return the information about the remaining amount of color material in the color material container, the alignment sequence of the color material container, and the direction of arrangement of the color material container to the application if the processor is unsuccessful in acquiring the information from the device.

6. The information processing apparatus according to claim 4, wherein the one or more processors is configured to execute the instructions to provide the application with information about a direction of insertion of the color material container, and
   wherein the application is configured to display the direction of insertion of the color material container on the basis of the received information about the direction of insertion of the color material container.

7. The information processing apparatus according to claim 1, wherein the one or more processors is configured to execute the instructions to acquire, from the device, a color name of the color material and the RGB value for each color material container.

8. The information processing apparatus according to claim 1,
   wherein the one or more processors is configured to execute the instructions to further requests install information that indicates whether a color material container of the color material is installed to the device or not, and
   wherein the one or more processors is configured to execute the instructions to acquire the install information from the device.

9. The information processing apparatus according to claim 1, wherein the device is a printer, a copier, or a multi-function apparatus.

10. An information processing method comprising:
    requesting for information on a color material of a device which performs a process by using the color material;
    acquiring, from the device, an RGB value representing a color of the color material as a response to the request; and
    generating an image corresponding to an amount of the color material based on the acquired RGB value.

11. The information processing method according to claim 10, further comprising displaying information of the color material using the generated image.

12. The information processing method according to claim 10, wherein the RGB value, a color name of the color material, a model name of a color material container of the color material, and a remaining amount of the color material in the color material container are acquired from the device.

13. The information processing method according to claim 10, wherein a color name of the color material and the RGB value for each color material container are acquired from the device.

14. The information processing method according to claim 10, further comprising:
    providing an application with information about the remaining amount of the color material in the color material container, an alignment sequence of the color material container, and a direction of arrangement of the color material container that indicates a direction in which the color material container is installed in the device as left to right, front to rear, or bottom to top in the device,
    wherein the application is configured to display the remaining amount of color material in the color material container in the alignment sequence according to the direction of arrangement of the color material container on the basis of the information about the remaining amount of the color material in the color material container, the alignment sequence of the color material container, and the direction of arrangement of the color material container received, and
    wherein the information about the remaining amount of the color material in the color material container, the alignment sequence of the color material container, and the direction of arrangement of the color material container received from the device are transferred to the application.

15. The information processing method according to claim 14, wherein the information about the remaining amount of color material in the color material container, the alignment sequence of the color material container, and the direction of arrangement of the color material container received from the device are transferred to the application if acquiring the information from the device is successful; and
    wherein the information about the remaining amount of color material in the color material container, the alignment sequence of the color material container, and the direction of arrangement of the color material container are returned to the application if acquiring the information from the device is unsuccessful.

16. The information processing method according to claim 14, wherein the application is provided with information about a direction of insertion of the color material container, and
    wherein the application is configured to display the direction of insertion of the color material container on the basis of the information about the direction of insertion of the color material container received.

17. The information processing method according to claim 10,
    wherein install information that indicates whether a color material container of the color material is installed to the device or not is further requested; and
    wherein the install information from the device is further acquired.

18. The information processing method according to claim 10, wherein the device is a printer, a copier, or a multi-function apparatus.

19. A non-transitory computer-readable storage medium storing executable instructions that causes a computer to implement a method, the method comprising:
    requesting for information on a color material of a device which performs a process by using the color material;
    acquiring, from the device, an RGB value representing a color of the color material as a response to the request; and
    generating an image corresponding to an amount of the color material based on the acquired RGB value.

20. The non-transitory computer-readable storage medium according to claim 19, wherein the device is a printer, a copier, or a multi-function apparatus.

* * * * *